US011225036B2

(12) United States Patent
Hagman

(10) Patent No.: US 11,225,036 B2
(45) Date of Patent: Jan. 18, 2022

(54) METHOD AND SYSTEM FOR TUNING A TOW PLACEMENT SYSTEM

(71) Applicant: The Boeing Company, Chicago, IL (US)

(72) Inventor: Thomas J. Hagman, Seattle, WA (US)

(73) Assignee: The Boeing Company, Chicago, IL (US)

( * ) Notice: Subject to any disclaimer, the term of this patent is extended or adjusted under 35 U.S.C. 154(b) by 64 days.

(21) Appl. No.: 16/036,383

(22) Filed: Jul. 16, 2018

(65) Prior Publication Data
US 2020/0016848 A1   Jan. 16, 2020

(51) Int. Cl.
| B29C 70/38 | (2006.01) |
| B64F 5/10 | (2017.01) |
| B64C 1/00 | (2006.01) |
| G05B 5/01 | (2006.01) |
| G05B 19/401 | (2006.01) |
| B29K 105/08 | (2006.01) |
| B29L 31/30 | (2006.01) |

(52) U.S. Cl.
CPC .......... *B29C 70/382* (2013.01); *B29C 70/386* (2013.01); *B64C 1/00* (2013.01); *B64F 5/10* (2017.01); *G05B 5/01* (2013.01); *G05B 19/401* (2013.01); *B29K 2105/0872* (2013.01); *B29L 2031/3076* (2013.01); *B64C 2001/0072* (2013.01)

(58) Field of Classification Search
None
See application file for complete search history.

(56) References Cited

U.S. PATENT DOCUMENTS

| 5,562,788 A * | 10/1996 | Kitson ................. B29C 70/384 |
| | | 156/378 |
| 9,694,546 B2 * | 7/2017 | Kisch ...................... B29C 70/38 |
| 2005/0240291 A1 | 10/2005 | Oldani et al. |
| 2009/0153847 A1 | 6/2009 | Engelbart et al. |
| 2015/0254835 A1 * | 9/2015 | Dorris ................... G06T 7/0008 |
| | | 382/141 |
| 2017/0341314 A1 | 11/2017 | Baker et al. |
| 2019/0168989 A1 | 6/2019 | Kobayashi |

OTHER PUBLICATIONS

Nonprovisional patent application filed concurrently entitled "Method and System for Verification of Tow End Placement" in the name of The Boeing Company.

* cited by examiner

*Primary Examiner* — Sean Shechtman
(74) *Attorney, Agent, or Firm* — Haynes and Boone, LLP

(57) ABSTRACT

A method and system for managing tow end placement. A tow is laid up over a tuning surface. A first position of a first tow end of the tow and a second position of a second tow end of the tow are measured. A first error between the first position of the first tow end and an expected position for the first tow end, and a second error between the second position of the second tow end and an expected position for the second tow end, are computed. A determination is made as to whether at least one of the first error or the second error is outside of selected tolerances. A start timing offset of a tow placement system is adjusted if the first error is outside of selected tolerances and a stop timing offset of the tow placement system is adjusted if the second error is outside of selected tolerances.

20 Claims, 15 Drawing Sheets

METHOD AND SYSTEM FOR TUNING A TOW PLACEMENT SYSTEM

FIELD

The present disclosure relates generally to laying up tows to form composite laminates. More particularly, the present disclosure relates to methods and systems for managing tows by verifying and managing the placement of tow ends of the tows based on the timing associated with movement of the tows during the layup process.

BACKGROUND

Composite objects are used in various types of platforms, including aircraft. A composite object may be formed from a composite laminate. A composite laminate, or composite layup, may be formed with multiple plies. Each ply may be formed by laying up multiple tows. As one example, plies may be grouped into layers. These groups may be referred to as sequences, with each sequence having multiple tows with tow ends. A tow end may be the end portion or end edge of a tow as cut by a layup system, which may be, for example, a numerically controlled automated fiber placement (AFP) machine. These AFP machines typically have one or more material placement heads that are manipulated to layup multiple tows for a composite laminate on a mandrel or similar tool. The composite laminate may take the form of, for example, a prepreg layup.

For example, multiple parallel tows may be laid up on a surface of a tool to form a single ply. Each of these tows may be, for example, a strip of composite tape or composite material. A tow may have a width of, for example, about 0.1 inches, about 0.3 inches, about 0.5 inches, or some other width. In some illustrative examples, the tows may be laid up in bands (or courses) to form a single layer, with each band including one or more tows. Each tow within a band may run the entire length of the band or only a portion of the band. Further, within a layer, some tows may have different lengths or positions such that the ends of the tows are in different positions relative to each other.

During the layup process, it is desirable to verify that the system is laying up the tows within selected tolerances of preselected or expected positions for the tows. One way of verifying tow position is by verifying the placement of tow ends. Some currently available methods for performing tow end verification include manually performing this verification after the layup of each layer (or ply) of the composite laminate. These methods may require more time than desired and may be less accurate than desired. For example, these methods may cause longer interruptions during the layup process than desired. Thus, one or more apparatuses and methods for addressing the above-described issues may be desired.

SUMMARY

In one example embodiment, a method is provided for managing tow end placement. A tow is laid up over a tuning surface. A first position of a first tow end of the tow is measured. A second position of a second tow end of the tow is measured. A first error between the first position of the first tow end and an expected position for the first tow end is computed. A second error between the second position of the second tow end and an expected position for the second tow end is computed. A determination is made as to whether at least one of the first error or the second error is outside of selected tolerances. A start timing offset of a tow placement system is adjusted if the first error is outside of selected tolerances and a stop timing offset of the tow placement system is adjusted if the second error is outside of selected tolerances.

In another example embodiment, a method is provided for managing a laying up of tows. A course of tows is laid up on a tool using a tow placement system. A verification process is performed for the course prior to laying up a next course. The verification process includes identifying a start latency and a stop latency for each tow of the course. A determination is made as to whether a layup of the course is within selected tolerances based on whether the identified start latencies are substantially equal to a start timing offset selected for the tow placement system and whether the identified stop latencies are substantially equal to a stop timing offset selected for the tow placement system. A tuning process is performed on a tuning surface if the layup of the course is not within selected tolerances.

In yet another example embodiment, a method is provided for managing a laying up of tows. A sequence of tows is laid up on a tool using a tow placement system. A verification process is performed for the sequence prior to laying up a next sequence. The verification process includes identifying a start latency and a stop latency for each tow of the sequence. A determination is made as to whether a layup of the sequence is within selected tolerances based on whether the identified start latencies are substantially equal to a start timing offset selected for the tow placement system and whether the identified stop latencies are substantially equal to a stop timing offset selected for the tow placement system.

In still another example embodiment, a system for managing tow placement during a laying up of a composite laminate includes a tow placement system, a measurement system, and a control system. The tow placement system lays up a tow over a tuning surface. A measurement system measures a first position of a first tow end of the tow and a second position of a second tow end of the tow. The control system computes a first error between the first position of the first tow end and an expected position for the first tow end. The control system computes a second error between the second position of the second tow end and an expected position for the second tow end. The control system determines whether at least one of the first error or the second error is outside of selected tolerances. The control system adjusts a start timing offset of a tow placement system if the first error is outside of selected tolerances and a stop timing offset of the tow placement system if the second error is outside of selected tolerances.

The features and functions may be achieved independently in various embodiments of the present disclosure or may be combined in yet other embodiments in which further details may be seen with reference to the following description and drawings.

BRIEF DESCRIPTION OF THE DRAWINGS

The novel features believed characteristic of the example embodiments are set forth in the appended claims. The example embodiments, however, as well as a preferred mode of use, further objectives and features thereof, will best be understood by reference to the following detailed description of example embodiments when read in conjunction with the accompanying drawings, wherein:

DETAILED DESCRIPTION

Figure 1:
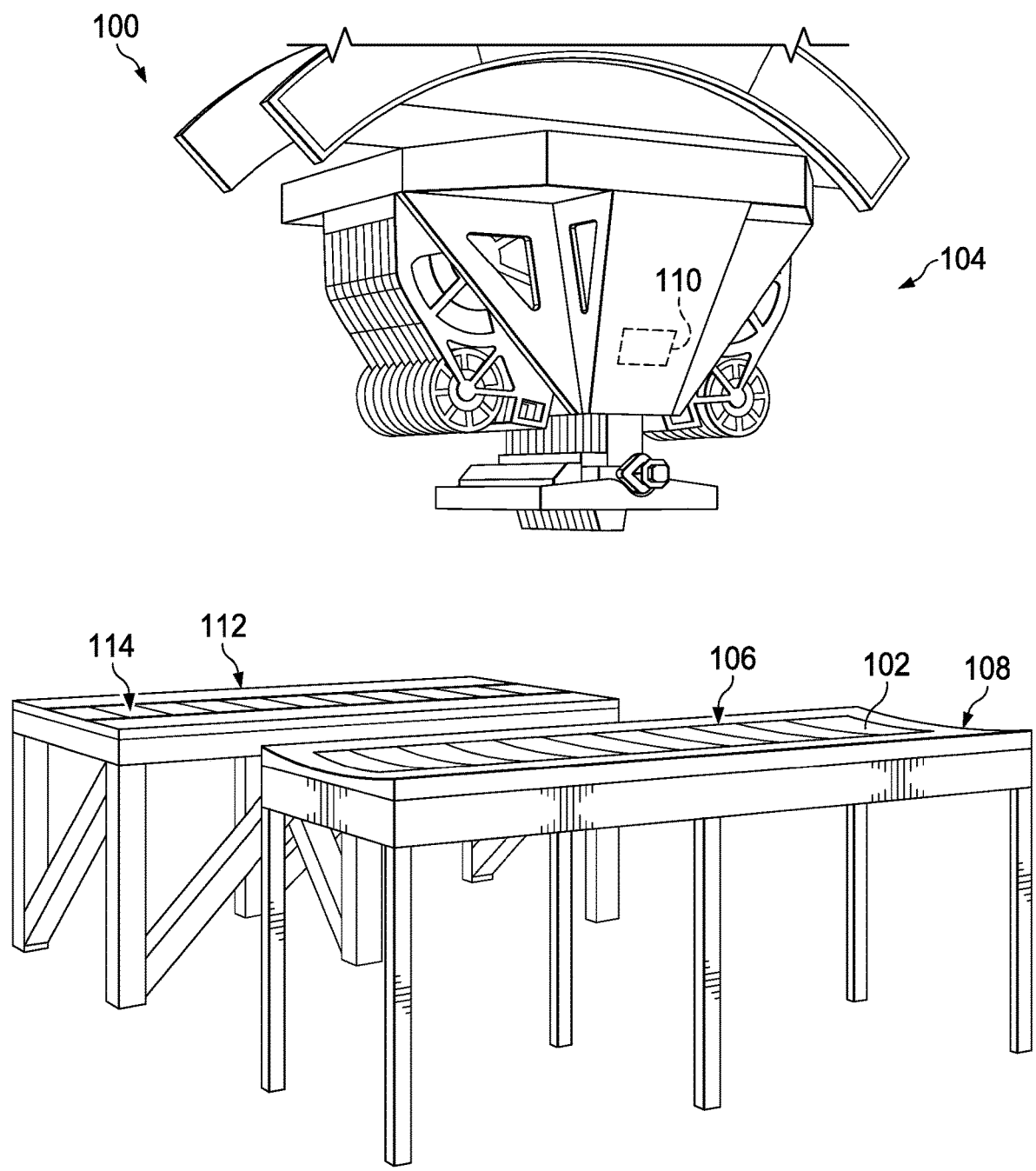
FIG. 1 is an illustration of a composite manufacturing environment in accordance with an example embodiment.

The example embodiments described below provide methods and systems for managing tow end placement more quickly, efficiently, and accurately. "Tow end placement" refers to the position of an end of a tow in the direction in which the tow is being laid up over a tool or other surface.

The example embodiments described below provide methods and systems for verifying tow end placement in a manner that eliminates the need for imaging and measuring tow end placement based on these images during the layup of a composite laminate. Further, the methods and systems described below reduce the overall time and processing resources needed for verification of tow end placement. The timing associated with movement of the tows is used to ultimately verify and manage the tow end placement.

A tow placement system may layup the plies for a composite laminate by moving tows through one or more tow feed mechanisms and rolling those tows onto a tool, such as a mandrel. These tow feed mechanisms may include mechanical components, pneumatic components, or both. For example, these tow feed mechanisms may include rollers, actuator pistons, piston seals, bearings, pneumatic valves, cutter devices, other types of components, or a combination thereof.

The example embodiments described below take into account that there may be a delay between the time an actuation command to move or stop moving a tow during layup is generated, sent, or received and the time at which the tow actually moves or stops moving, respectively. This delay may be due to any combination of factors including, for example, without limitation, the age of the parts of the tow placement system, wear of these parts over time, movement of one or more of these parts during operation of the tow placement system, and other factors.

In one example embodiment, the delay (e.g., latency or time interval) between a time at which a command is generated or sent to begin movement of a tow for a layup sequence and the time at which the tow actually begins moving during the layup process is used to determine whether the system is operating within selected tolerances (or selected operational parameters). For example, the latency may be expected to be within a selected range (e.g., ±0.05 seconds, ±0.005 seconds, etc.) surrounding the timing offset value determined during the tuning process. This verification step may be repeated for each course within a sequence and for each sequence. If the latency drifts away from the expected timing offset, this drift indicates that the tow ends for those tows may not be in their expected position. The latency drifting away from the expected timing offset may indicate that the timing offset needs to be adjusted. This adjustment may be performed in a variety of different ways during the overall layup process for the composite laminate to ensure that tows are desirably placed in later sequences.

Thus, this verification process does not require imaging each layer of tows laid up and analyzing those images automatically and/or manually to determine the positions of tow ends. Further, the verification process does not require a human operator manually determining whether the tow ends are in the correct positions. By eliminating the need for manual and image-based determinations of tow end placement, the overall time needed to verify tow placement via tow end placement is reduced. Further, the overall time needed for the total layup process for the composite laminate may be reduced. Still further, the tow ends may not need to be reworked after each layer because the system may be adjusted as needed throughout the layup process.

The example embodiments therefore provide methods and apparatuses for improving the speed, efficiency, and accuracy with which tows are laid up. For example, a composite laminate for a spar may require about 150 sequences. Using the verification methods and systems described by the various example embodiments may provide time savings of about 5 minutes per sequence. Thus, these verification methods and systems may provide overall time savings of between about 12 and 13 hours per composite laminate.

FIG. 1 is an illustration of a composite manufacturing environment in accordance with an example embodiment. Composite manufacturing environment 100 is an example of one type of manufacturing environment in which composite laminate 102 may be formed. Composite laminate 102 may be used to form, for example, an aircraft structure or some other type of composite structure. Tow placement system 104 is an example of one type of system that may be used to layup tows. In this illustrative example, tow placement system 104 is an automated fiber placement (AFP) system. This AFP system is a robotic system.

As depicted, tow placement system 104 is used to lay up tows 106 over tool 108 to form composite laminate 102. Tows 106 are laid up in multiple layers, or plies. Each layer may be a sequence of tows 106. The sequence of tows 106 may include one or more courses of tows 106. Each course, which may also be referred to as a band, may include one or more tows 106. Typically, tows 106 in any given sequence are substantially parallel (e.g., parallel or near parallel) to each other. Further, tows 106 in any given sequence may have the same lengths or different lengths. For example, one course of tows 106 in a sequence may have tows of a first length, while another course of tows 106 in that same sequence may have tows of a second length that is different from the first length.

In this illustrative example, tows 106 in each sequence are laid up substantially parallel, or in the same orientation as, the other sequences of tows 106. In other illustrative examples, tows 106 in different sequences may be laid up in different orientations.

During the layup process, some sequences of tows 106 may be full coverage sequences that fully cover a designated area over tool 108. Other sequences may be partial coverage sequences that only partially overlap the designated area over tool 108. For example, a first sequence may be a full coverage sequence while the next sequence may be a partial coverage sequence having tows that only partially overlap the tows of the first sequence. In some illustrative examples, a mix of one or more full coverage sequences and one or more partial coverage sequences may be used when composite laminate 102 is desired to have a non-planar contour or complex contour. For example, partial coverage sequences may allow variations in contour, curves, grooves, steps, and other features to be formed more easily.

Control system 110 is an example of one implementation for control system 512 in FIG. 5, which is described in greater detail below. Control system 110 may be used to verify tow end placement after each sequence of tows 106 is laid up. If control system 110 determines that the placement of tow ends is not satisfactory or is only borderline satisfactory, control system 110 may cause tow placement system 104 to move to tuning table 112 to perform a tuning process. The tuning process includes laying up test tows 114 over tuning table 112. This tuning process may be a calibration process for calibrating tow placement system 104. The calibration of tow placement system 104 may be performed periodically at predetermined intervals or random intervals.

Control system 110 may perform the tuning process to adjust the settings of tow placement system 104 to ensure that future tows are desirably placed over tool 108. Thus, control system 110 may verify tow end placement in real-time or near real-time and perform the tuning process when needed during the layup of composite laminate 102.

Figure 2:
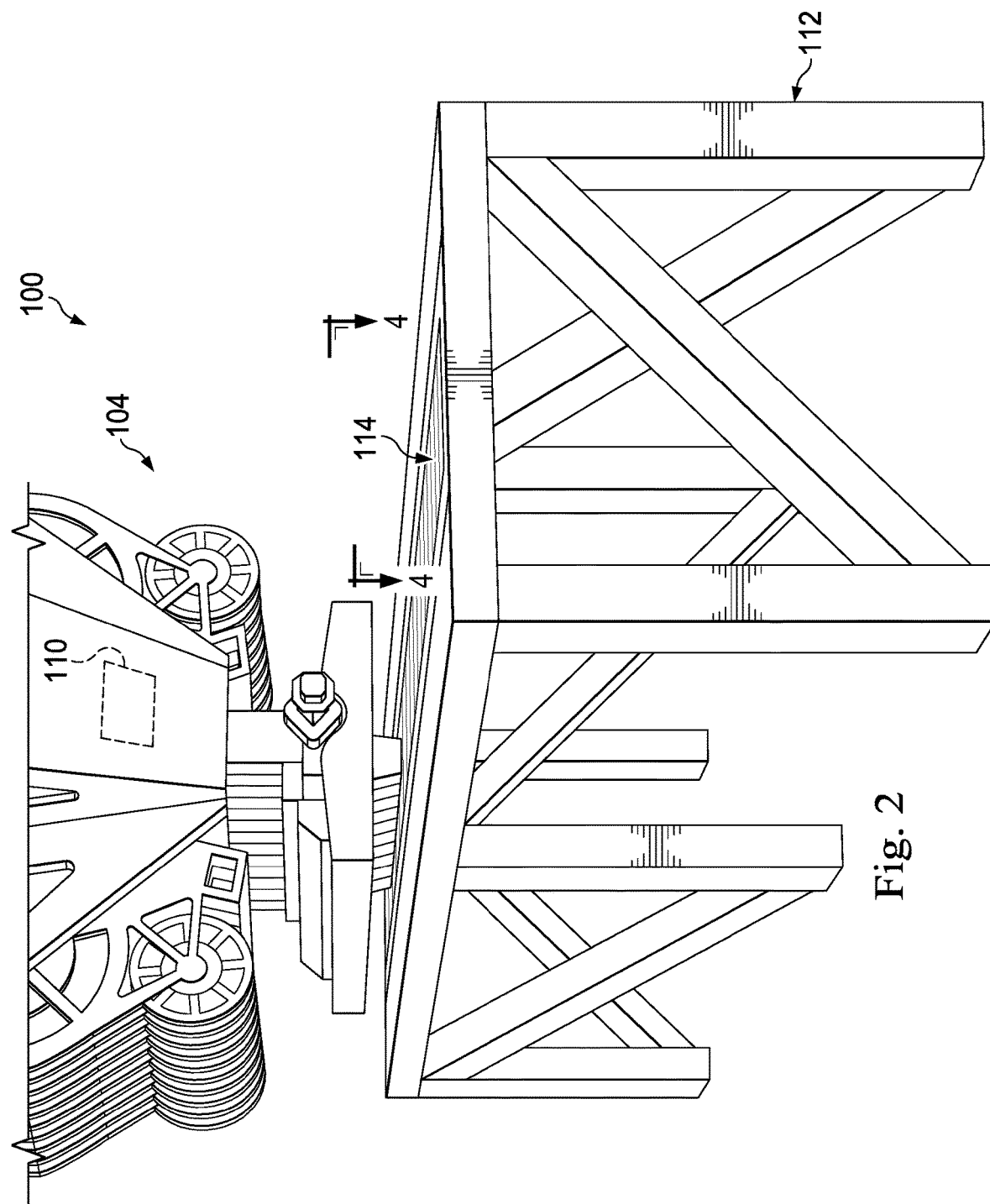
FIG. 2 is an illustration of a portion of the composite manufacturing environment 100 in accordance with an example embodiment.

FIG. 2 is an illustration of a portion of a composite manufacturing environment 100 from FIG. 1 in accordance with an example embodiment. In FIG. 2, tow placement system 104 is laying up test tows 114 over tuning table 112 so that control system 110 may perform a tuning process.

Figure 3:
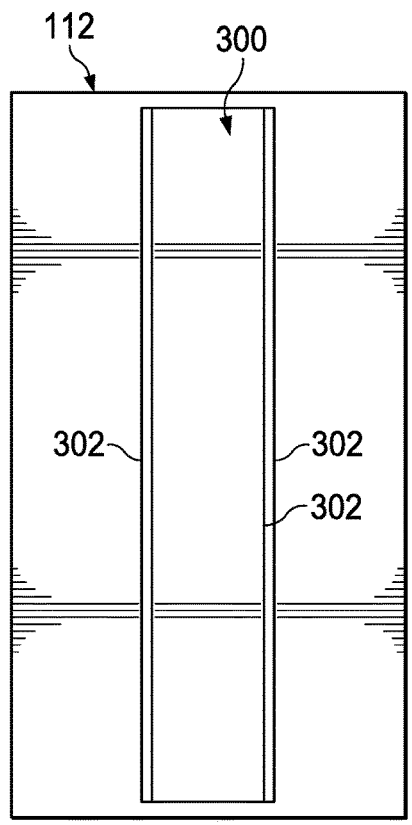
FIG. 3 is an illustration of a top view of the tuning table from FIGS. 1 and 2 in accordance with an example embodiment.

FIG. 3 is an illustration of a top view of tuning table 112 from FIGS. 1 and 2 in accordance with an example embodiment. As depicted, tuning table 112 has surface 300. Notches 302 are present in surface 300. Notches 302 may be used as guides to determine whether tow ends are being laid up as desired. As one illustrative example, the desired placement of a tow end for any given tow may be about 0.5 inches away from a notch.

Figure 4:
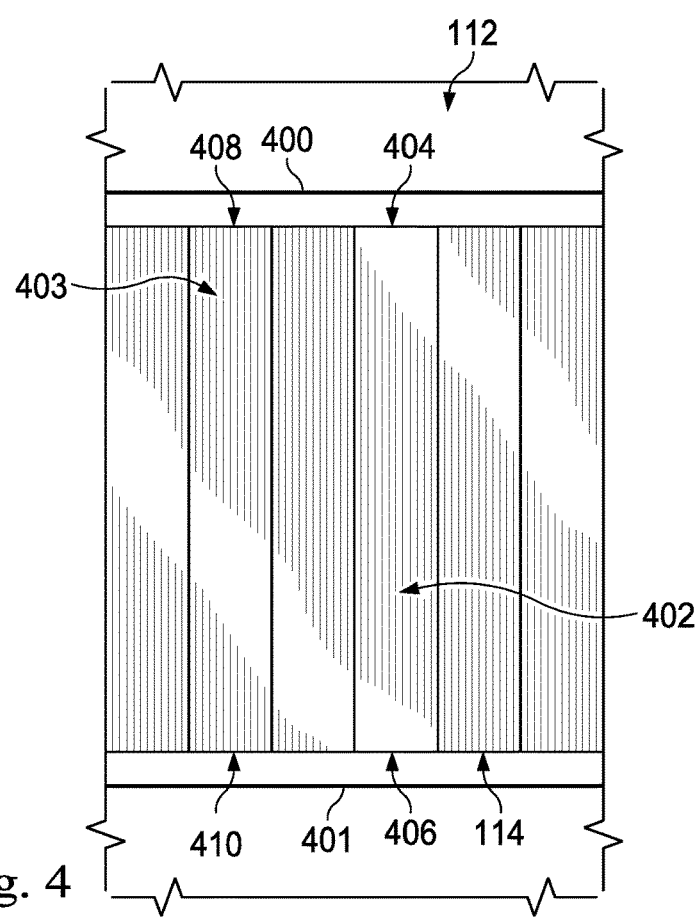
FIG. 4 is an illustration of a top view of a portion of the tuning table with test tows laid up over the tuning table in accordance with an example embodiment.

FIG. 4 is an illustration of a top view of a portion of tuning table 112 with test tows 114 laid up over tuning table 112, depicted with respect to lines 4-4 in FIG. 2, in accordance with an example embodiment. As depicted, test tows 114 have been laid up between notch 400 and notch 401. Test tows 114 include, for example, tow 402 and tow 403. Tow 402 has tow end 404 and tow end 406. Tow 403 has tow end 408 and tow end 410.

Control system 110 shown in FIGS. 1 and 2 may adjust the settings of tow placement system 104 in FIG. 1 any number of times until test tows 114 have tow ends that are desirably placed relative to notch 400 and notch 401. Tow 402 may be considered desirably placed when tow end 404 and tow end 406 are each at a selected distance away from notch 400 and notch 401, respectively. Similarly, tow 403 may be considered desirably placed when tow end 408 and tow end 410 are each at a selected distance away from notch 400 and notch 401, respectively.

This selected distance may be about 0.5 inches. More specifically, tow 403 may be considered desirably placed when tow end 408 is within ±0.01 inches, ±0.001 inches, ±0.05 inches, ±0.10 inches, or some other predetermined range of the selected distance of 0.5 inches. In other illustrative examples, the selected distance may be about 0.2 inches, 0.25 inches, 0.4 inches, 0.6 inches, 1 inch, 1.5 inches, or some other distance away from the notches.

Figure 5:
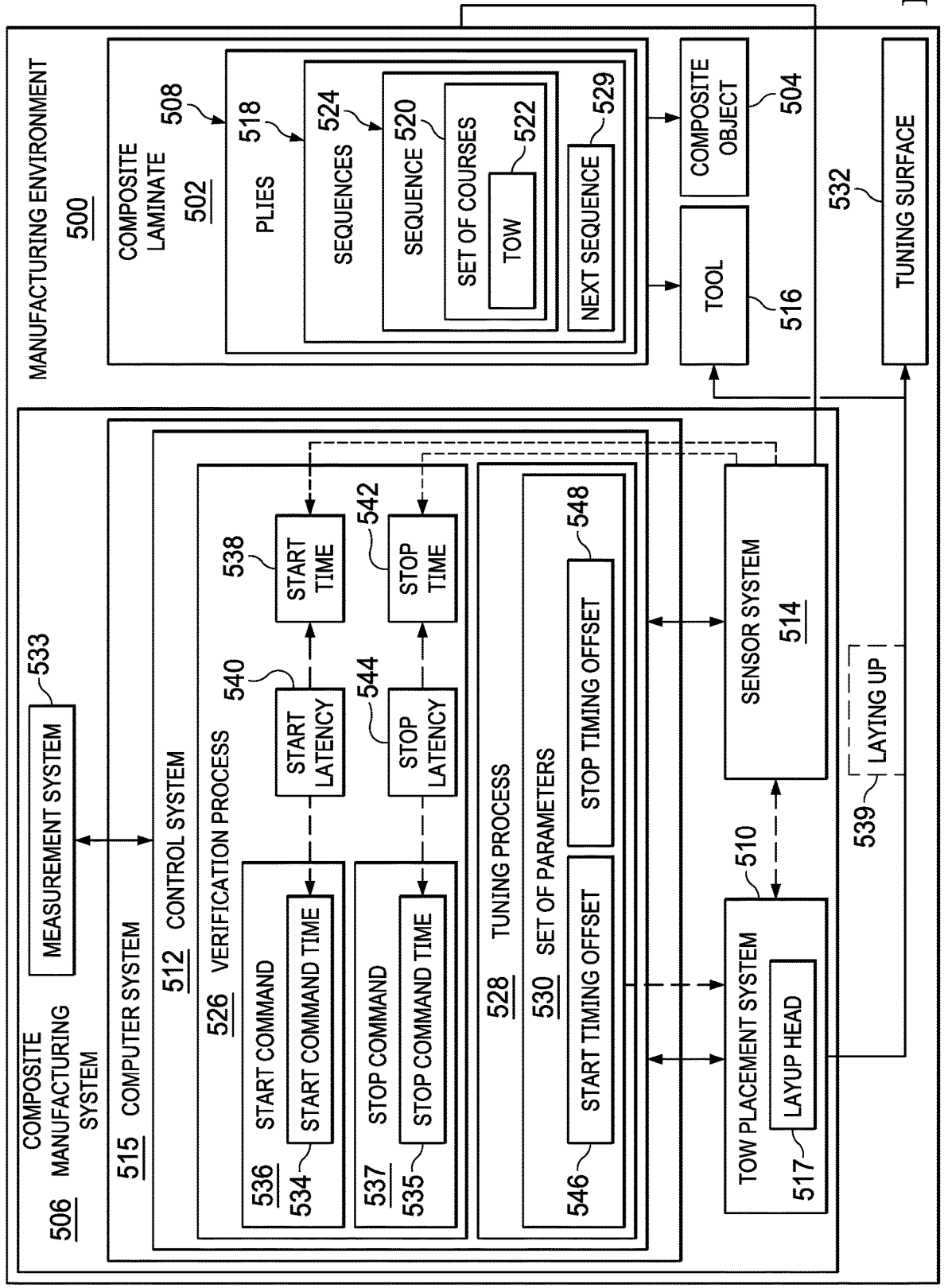
FIG. 5 is a block diagram of a manufacturing environment in accordance with an example embodiment.

FIG. 5 is a block diagram of a manufacturing environment in accordance with an example embodiment. Manufacturing environment 500 is an example of one type of manufacturing environment 500 in which composite laminate 502 may be formed. Composite manufacturing environment 100 in FIGS. 1 and 2 is an example of one implementation for manufacturing environment 500. Composite laminate 102 being formed in FIG. 1 is an example of one implementation for composite laminate 502.

Composite laminate 502 may be used to form composite object 504, which may take any number of different forms. Composite object 504 may also be referred to as a composite part or composite structure. Composite object 504 may be any object or structure formed out of or fabricated from composite material. In some cases, composite object 504 may be fully formed of composite material. Composite object 504 may take the form of, for example, without limitation, a spar, a beam, a frame, a rib, an intercostal, a stringer, a wing structure, a fuselage structure, a stabilizer structure, a blade, a composite panel, some other composite aircraft structure, or some other type of composite structure.

Composite manufacturing system 506 may be used to manufacture composite laminate 502. As depicted, composite laminate 502 may be comprised of a plurality of plies 508. Each ply of plies 508 may be comprised of multiple tows, each of which may be comprised of a composite material.

Composite manufacturing system 506 may include tow placement system 510, control system 512, and sensor system 514. In one illustrative example, tow placement system 510 takes the form of an automated fiber placement system, which may be a computer numerically controlled (CNC) machine. Tow placement system 510 may be controlled by control system 512. In other words, tow placement system 510 may be controlled using numerically controlled (NC) programming. This programming may be controlled by control system 512. Control system 512 may be part of or separate from tow placement system 510. In some cases, a portion of control system 512 may be part of tow placement system 510, while another portion of control system 512 may be separate from tow placement system 510.

Control system 512 may be implemented using software, hardware, firmware, or a combination thereof. When software is used, the operations performed by control system 512 may be implemented using, for example, without limitation, program code configured to run on a processor unit. When firmware is used, the operations performed by control system 512 may be implemented using, for example, without limitation, program code and data and stored in persistent memory to run on a processor unit.

When hardware is employed, the hardware may include one or more circuits that operate to perform the operations performed by control system 512. Depending on the implementation, the hardware may take the form of a circuit system, an integrated circuit, an application specific integrated circuit (ASIC), a programmable logic device, or some other suitable type of hardware device configured to perform any number of operations. A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In one illustrative example, control system 512 is implemented using computer system 515. Computer system 515 may include a single computer or multiple computers in communication with each other.

In these illustrative examples, tow placement system 510 is controlled by control system 512 to lay up plies 508 over tool 516 to form composite laminate 502. Tool 516 may also be referred to as a mandrel or a part. Tow placement system 510 may include one or more layup heads, such as layup head 517. Layup head 517 is capable of laying up multiple, substantially parallel tows at a same time. For example, a single layup head may have between about 5 and 25 tow feed mechanisms for laying up between about 5 and 25 respective tows. In other illustrative examples, a layup head may have only a single tow feed mechanism or up to 40 tow feed mechanisms.

Plies 508 are laid up over tool 516 as sequences 518. In other words, each of plies 508 may represent a corresponding one of sequences 518 of tows. Each of sequences 518 may include set of courses 520. As used herein, a "set of" items includes one or more of the items. Thus, set of courses 520 may include one or more courses. Each course in set of courses 520 includes a set of tows (i.e., one or more tows). Tow 522 is an example of a tow in sequence 524 of sequences 518.

During the layup process, the placement of the tows that make up each of sequences 518 is verified using sensor system 514 and control system 512. Sensor system 514 is in communication with control system 512. In some cases, sensor system 514 may also be in communication with tow placement system 510. In these illustrative examples, sensor system 514 may include one or more sensors.

In one or more illustrative examples, sensor system 514 is attached to or considered part of tow placement system 510. In other illustrative examples, some portion of sensor system 514 may be positioned relative to tool 516. In still other illustrative examples, sensor system 514 may be positioned on, near, or otherwise relative to a layup head, such as layup head 517, of tow placement system 510. Sensor system 514 may include a movement sensor. For example, sensor system 514 is configured to detect movement of a tow, such as tow 522. Sensor system 514 may detect when movement of tow 522 begins and when movement of tow 522 stops.

In some illustrative examples, sensor system 514 may include a sensor device for each layup head of tow placement system 510. For example, sensor system 514 may include a sensor device designated for layup head 517. In other illustrative examples, sensor system 514 may include a sensor device for each tow feed mechanism in each layup head of tow placement system 510. Thus, sensor system 514 may be implemented and configured in various ways.

In these illustrative examples, verification process 526 is performed for each of sequences 518. If the result of verification process 526 is satisfactory, a next sequence of tows is laid up. If the result of verification process 526 is not satisfactory, tuning process 528 is performed prior to beginning the layup of a next sequence 529 of tows.

Tuning process 528 is used to adjust set of parameters 530 for at least one of tow placement system 510 or control system 512. In some cases, this adjustment may be referred to as "tuning" or "calibrating" tow placement system 510. In these illustrative examples, tuning process 528 may be performed separately and away from tool 516. For example, tuning process 528 may be performed over tuning surface 532 by laying up one or more tows and measuring or otherwise determining the positions of the tow ends of these tows. Tuning surface 532 may take the form of a table, a flat plate, or some other type of surface. Tuning table 112 in FIGS. 1, 2, and 3 is an example of one implementation for tuning surface 532.

Tuning process 528 may be used to calibrate tow placement system 510. This calibration may be performed periodically at predetermined intervals or random intervals.

The tow end positions may be measured using measurement system 533. Measurement system 533 may take various forms. In some cases, measurement system 533 may include a camera, a position sensor, a laser, some other type of device, or a combination thereof. Measurement system 533 may be separate from tow placement system 510, integrated as part of tow placement system 510, or both. The positions of these tow ends may be used to determine whether set of parameters 530 of at least one of tow placement system 510 or control system 512 needs to be adjusted.

For each sequence, such as sequence 524, verification process 526 may be performed. Here, verification process 526 is described with respect to a single tow. But the below process may be applicable to an entire course or entire sequence, depending on the implementation. Verification process 526 is used to verify tow end placement. "Tow end placement" or the placement of a tow end of tow 522 may be the position of the tow end with respect to the direction in which tow 522 is being laid up over tool 516. For example, the placement of the tow end may refer to the position of the tow end on tool 516 along the axis of movement of the roller of tow placement system 510 that lays up tow 522 over tool 516.

Verification process 526 may include determining start command time 534 at which start command 536 is generated by control system 512, sent to tow placement system 510, or received by tow placement system 510. Start command 536 may be, for example, an actuation command to begin movement and laying up 539 of tow 522. Further, verification process 527 may include determining stop command time 535 at which stop command 537 is generated by control system 512, sent to tow placement system 510, or received by tow placement system 510. Stop command 537 may be, for example, an actuation command to stop or halt the movement and laying up 539 of tow 522.

Sensor system 514 detects start time 538 at which movement of tow 522 is initiated for the layup process. Control system 512 determines start latency 540 between start time 538 and start command time 534. Start latency 540 is the time interval or period between start time 538 and start command time 534. Control system 512 uses start latency 540 to determine whether set of parameters 530 needs to be adjusted.

Further, sensor system 514 may detect stop time 542 at which movement of tow 522 is stopped or halted. Control system 512 determines stop latency 544 between stop time 542 and stop command time 535. Stop latency 544 is the time interval or period between stop time 542 and stop command time 535. Control system 512 uses stop latency 544 to determine whether set of parameters 530 needs to be adjusted.

Set of parameters 530 may include, for example, at least one of start timing offset 546, stop timing offset 548, or some other parameter. Start timing offset 546 determines how early start command 536 is generated, sent, or received relative to the desired start time for the movement of a tow 522. Stop timing offset 548 determines how early stop command 537 is generated, sent, or received relative to the desired stop time for the movement of tow 522.

If start timing offset 546, stop timing offset 548, or both need to be adjusted, tuning process 528 may be used to perform these adjustments. Tuning process 528 is described in greater detail in the figures below.

Thus, verification process 526 and tuning process 528 reduce the overall time needed for inspection of plies 508 during the fabrication of composite laminate 502. For example, performing verification process 526 may eliminate a need to physically inspect each course of each of sequences 518 or even each of sequences 518. Further, verification process 526 ensures that tuning process 528 is only performed when tow placement is becoming borderline unsatisfactory, is borderline unsatisfactory, or is unsatisfactory.

The illustration of composite manufacturing system 506 in FIG. 5 is not meant to imply physical or architectural limitations to the manner in which an illustrative embodiment may be implemented. Other components in addition to or in place of the ones illustrated may be used. Some components may be optional. Further, the blocks are presented to illustrate some functional components. One or more of these blocks may be combined, divided, or combined and divided into different blocks when implemented in an illustrative embodiment.

For example, verification process 526 is described above with respect to each of sequences 518. In other illustrative examples, verification process 526 may be performed for each of courses 520 within each of sequences 518. As one illustrative example, the start latency for each of courses 520 within a particular sequence 524 may be averaged to determine an overall start latency 540 for sequence 524. In still other illustrative examples, each of courses 520 may be evaluated to determine whether tuning process 528 needs to be performed before a next course within a same sequence 524.

Figure 6:
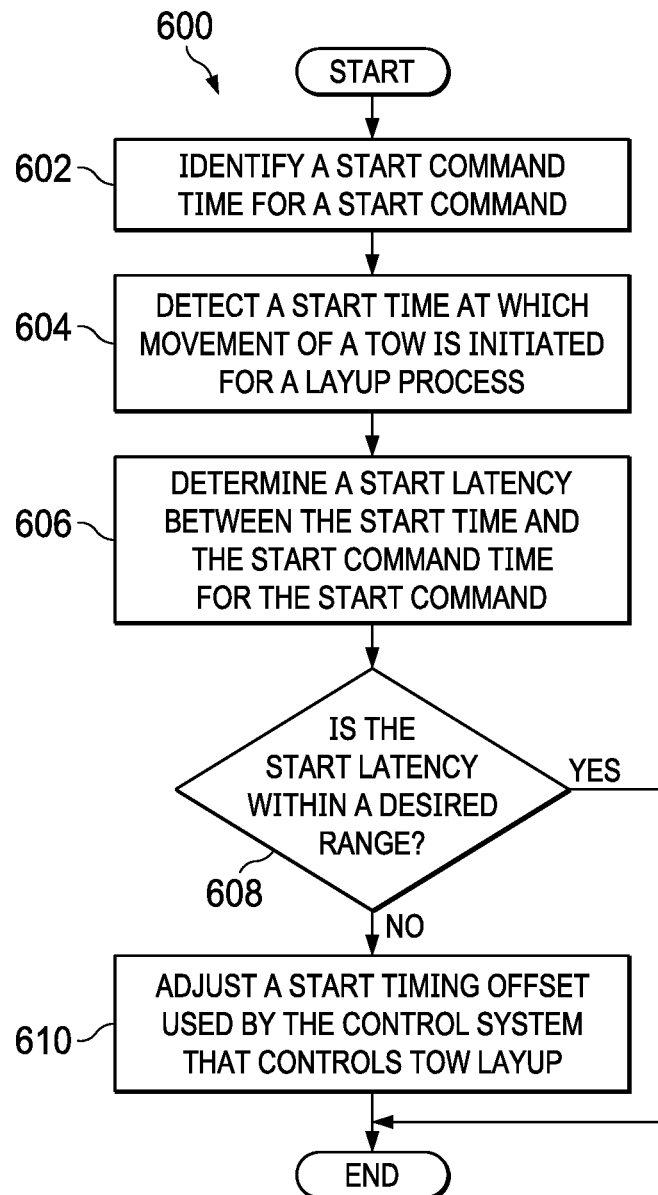
FIG. 6 is a flowchart of a process for managing tow end placement in accordance with an example embodiment.

FIG. 6 is flowchart of a process for managing tow end placement in accordance with an example embodiment. Process 600 illustrated in FIG. 6 may be an example of one process included in verification process 526 described in FIG. 5. Further, process 600 illustrated in FIG. 6 may be implemented using composite manufacturing system 506 in FIG. 5. In particular, process 600 may be performed using sensor system 514 and control system 512 of FIG. 5.

Process 600 may begin by identifying a start command time for a start command (operation 602). In operation 602, the start command time may be based on when the start command is generated, received, or sent. The start command may be, for example, an actuation command.

Thereafter, a start time at which movement of a tow is initiated for a layup process is detected (operation 604). Movement of the tow begins in response to stop command.

Operation 604 may be performed using, for example, sensor system 514 described in FIG. 5. A start latency between the start time and the start command time for the start command is determined (operation 606). For example, the start latency may be the time interval or period between the start time at which movement of the tow is detected and the start command time at which the start command is received by a layup head of tow placement system 510.

Next, a determination is made as to whether the start latency is within a desired range (operation 608). If the start latency is within the desired range, the process terminates. If the start latency is not within the desired range, a start timing offset used by the control system that controls tow layup is adjusted (operation 610), with the process terminating thereafter.

Operation 610 may be performed in a variety of different ways. In one illustrative example, the start timing offset may be adjusted by setting control system 512 to generate or send the start command earlier or later.

Process 600 may be repeated for each of courses 520 of tows or each of sequences 518 of tows. Further, although process 600 is described below with respect to a single tow, such as tow 522 in FIG. 5, process 600 may be similarly applied with respect to an entire course or sequence of tows.

For example, in operation 604, the start time may be the time at which all tows on the layup heads in tow placement system 510 that are designated for a particular course begin movement. In some cases, the start time may be a mean, median, or other statistical variation of the start times for all the tows in the course. When process 600 is performed for a sequence of tows, such as sequence 524, the start latency identified in operation 606 may be a mean, median, or other statistical variation of the start latencies for all the courses in the sequence. Further, when process 600 is performed for a course or sequence of tows, adjusting the start timing offset in operation 610 may include adjusting the start timing offsets for each tow feed mechanism of, for example, layup head 517 of tow placement system 510.

Figure 7:
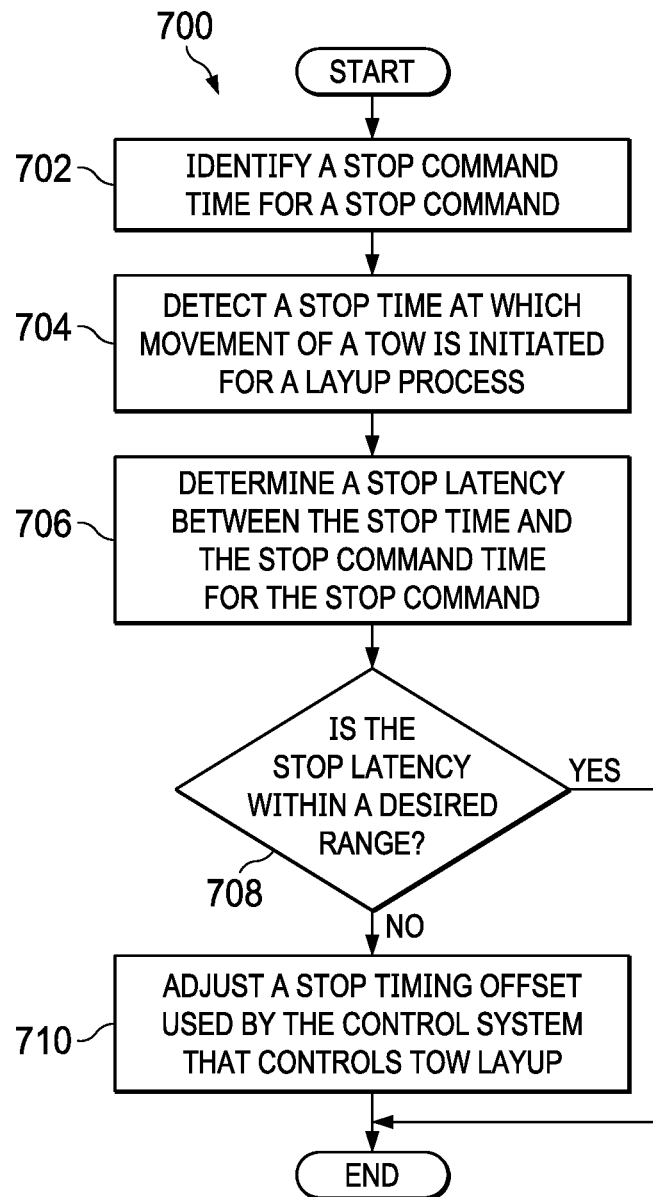
FIG. 7 is a flowchart of a process for managing tow end placement in accordance with an example embodiment.

FIG. 7 is flowchart of a process for managing tow end placement in accordance with an example embodiment. Process 700 illustrated in FIG. 7 may be an example of one process included in verification process 526 described in FIG. 5. Further, process 700 illustrated in FIG. 7 may be implemented using composite manufacturing system 506 in FIG. 5. In particular, process 700 may be performed using sensor system 514 and control system 512 of FIG. 5. In some illustrative examples, process 700 may be performed in combination with process 600 as part of verification process 526.

Process 700 may begin by identifying a stop command time for a stop command (operation 702). In operation 702, the stop command time may be based on when the stop command is generated, received, or sent. The stop command may be, for example, an actuation command.

Thereafter, a stop time at which movement of the tow is stopped during a layup process is detected (operation 704). The movement of the tow is stopped or halted in response to stop command. Operation 704 may be performed using, for example, sensor system 514 described in FIG. 5. A stop latency between the stop time and the stop command time for the stop command is determined (operation 706). For example, the stop latency may be the time interval or period between the stop time at which movement of the tow is detected as stopped or halted and the stop command time at which the stop command is received by a layup head of tow placement system 510.

Next, a determination is made as to whether the stop latency is within a desired range (operation 708). If the stop latency is within the desired range, the process terminates. If the stop latency is not within the desired range, a stop timing offset used by the control system that controls tow layup is adjusted (operation 710), with the process terminating thereafter.

Operation 710 may be performed in a variety of different ways. In one illustrative example, the stop timing offset may be adjusted by setting control system 512 to generate or send the stop command earlier or later.

Process 700 may be repeated for each of courses 520 of tows or each of sequences 518 of tows. Further, although process 700 is described below with respect to a single tow, such as tow 522 in FIG. 5, process 700 may be similarly applied with respect to an entire course or sequence of tows. For example, in operation 704, the stop time may be the time at which all tows on the layup heads in tow placement system 510 that are designated for a particular course begin movement. In some cases, the stop time may be a mean, median, or other statistical variation of the stop times for all the tows in the course. When process 700 is performed for a sequence of tows, such as sequence 524, the stop latency identified in operation 706 may be a mean, median, or other statistical variation of the stop latencies for all the courses in the sequence. Further, when process 700 is performed for a course or sequence of tows, adjusting the stop timing offset in operation 710 may include adjusting the stop timing offsets for each tow feed mechanism of, for example, layup head 517 of tow placement system 510.

Thus, each of process 600 and process 700 may be examples of a general process for managing tow end placement. A time at which movement of a tow is initiated or stopped during a layup process is detected. A latency between this time and a command time corresponding to a command to begin movement or stop movement of the tow is determined. A determination is made as to whether the latency is within a desired range. A timing offset used by a control system that controls tow layup is adjusted in response to a determination that the latency is not within the desired range.

Figure 8:
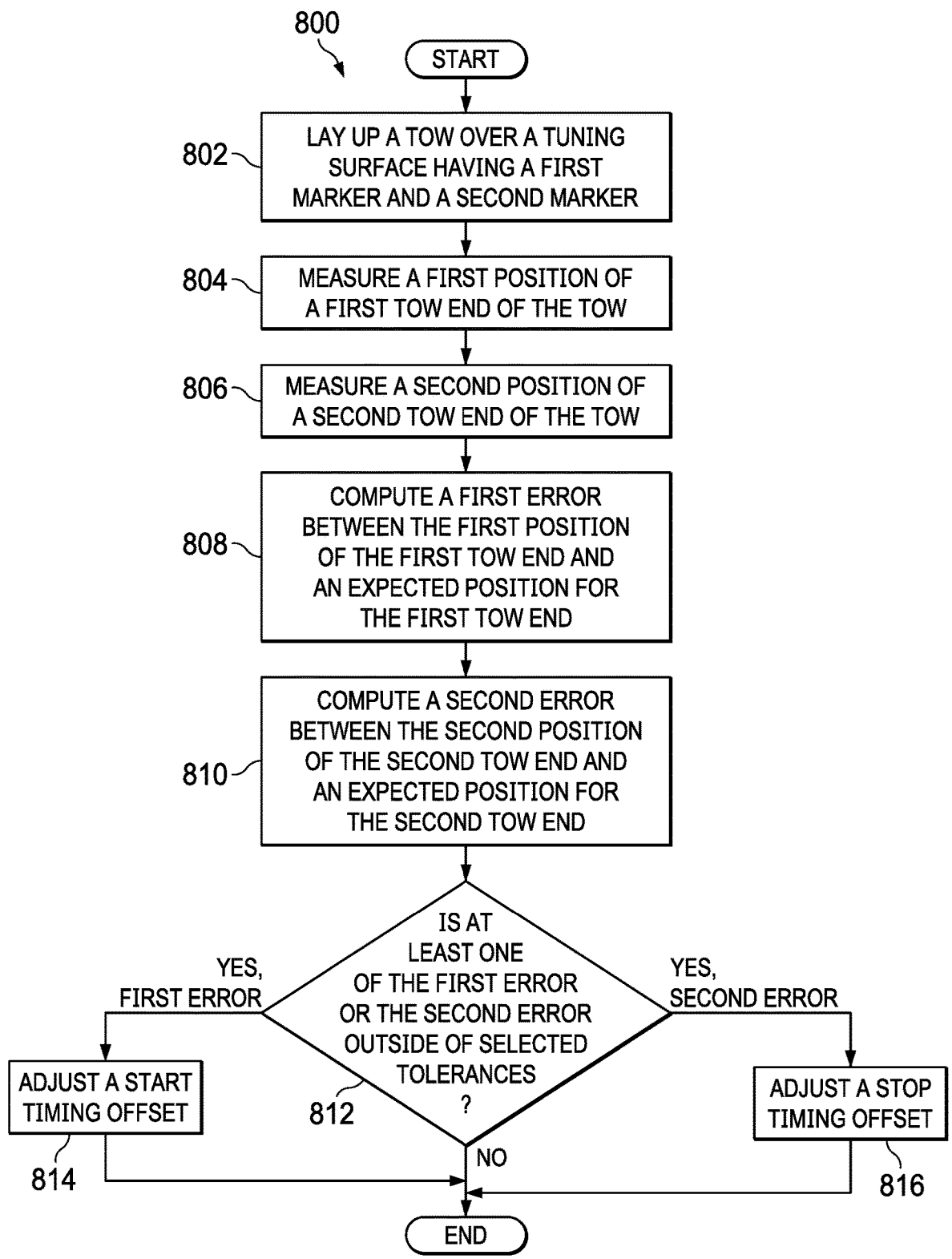
FIG. 8 is a flowchart of a tuning process in accordance with an example embodiment.

FIG. 8 is flowchart of a tuning process in accordance with an example embodiment. Process 800 illustrated in FIG. 8 may be used to implement tuning process 528 described in FIG. 5. Further, process 800 illustrated in FIG. 8 may be implemented using composite manufacturing system 506 in FIG. 5. In particular, process 800 may be performed using control system 512 and measurement system 533 of FIG. 5.

Process 800 may begin by laying up a tow over a tuning surface having a first marker and a second marker (operation 802). The tuning surface, which may be tuning surface 532 of FIG. 5, may take the form of a flat plate. The first marker and the second marker may be, for example, gage marks, ink marks, taped labels, laser marks, or notches in the surface of the tuning surface. These markers may be used to indicate expected positions for the tow ends of the tow. Deviations from this placement are attributable to undesired latency in the start and/or start times for the movement of the tow.

In other illustrative examples, the first and second markers may be implemented using sensors on or embedded in the tuning surface. In some cases, the first and second markers may be implemented using any type of on- or in-surface feature for use in identifying the relative position of a tow end.

Once the tow is laid up, a first position of a first tow end of the tow is measured (operation 804). A second position of a second tow end of the tow is measured (operation 806). Operations 804 and 806 may be performed using, for example, measurement system 533 in FIG. 5.

Thereafter, a first error between the first position of the first tow end and an expected position for the first tow end is computed (operation 808). Operation 808 may include, for example, computing a distance between the first position of the first tow end and the first marker on the tuning surface. Further, operation 808 may include computing a difference between a preselected distance and the distance computed between the first position of the first tow end and the first marker. This difference being outside of design tolerances is an indication that the tow placement system should be calibrated.

The preselected distance may be selected from one of about 0.25 inches, 0.5 inches, 0.75 inches, or some other distance from the first marker. Design tolerances for the difference computed in operation 808 may be, for example, without limitation, a difference of less than or equal to ±0.01 inches, ±0.001 inches, ±0.05 inches, ±0.10 inches, or some other ±value. The design tolerances selected may be dependent on the type of composite object being formed. In one illustrative example, the first tow end of the tow, which may be tow 522 from FIG. 5, that is first laid up over the tuning surface may be expected within ±0.001 inches of the preselected distance of 0.5 inches after the first marker.

A second error between the second position of the second tow end and an expected position for the second tow end is computed (operation 810). Operation 810 may include, for example, computing a distance between the second position of the second tow end and the second marker on the tuning surface. Further, operation 810 may include computing a difference between a preselected distance and the distance computed between the second position of the second tow end and the second marker. This difference being outside of design tolerances is an indication that the tow placement system should be calibrated.

The preselected distance may be selected from one of about 0.25 inches, 0.5 inches, 0.75 inches, or some other distance from the first marker. Design tolerances for the difference computed in operation 808 may be, for example, without limitation, a difference of less than or equal to ±0.01 inches, ±0.001 inches, ±0.05 inches, ±0.10 inches, or some other ±value. The design tolerances selected may be dependent on the type of composite object being formed. In one illustrative example, the second tow end, which is laid up after the first tow end, may be expected within ±0.001 inches of the preselected distance of 0.5 inches before the second marker.

A determination is then made as to whether at least one of the first error or the second error is outside of selected tolerances (operation 812). As described above, the selected tolerances may be a deviation of no more than about ±0.01 inches from the expected position. In other illustrative examples, the selected tolerances may be a deviation of no more than about +0.025 inches from the expected position. In still other illustrative examples, the selected tolerances may be a deviation of no more than about ±0.10 inches or about ±0.25 inches from the expected position.

In one illustrative example, operation 812 includes determining whether the difference between the preselected distance and the distance computed between the first position of the first tow end and the first marker is within a selected range of zero. Further, operation 812 may include determining whether the difference between the preselected distance and the distance computed between the second position of the second tow end and the second marker is within a selected range of zero. The selected range may be, for example, about ±0.01 inches, about ±0.10 inches, or about ±0.25 inches with respect to zero.

The selected tolerances may depend on a number of different factors. These factors may include, for example, without limitation, the type of composite material that the tows are made of, the width of the tow, the composite object or structure being ultimately formed, a speed with which the tows are being laid up, one or more other factors, or a combination thereof. For example, the tolerances for a composite spar or composite wing may be stricter than the tolerances for a fuselage panel.

With reference again to operation 812, if neither the first error nor the second error is outside of selected tolerances, the process terminates. However, if the first error is outside of selected tolerances, a start timing offset is adjusted (operation 814), with the process terminating thereafter. Similarly, if the second error is outside selected tolerances, a stop timing offset is adjusted (operation 816), with the process terminating thereafter. Thus, if both the first error and the second error are outside of selected tolerances, operation 814 and operation 816 are both performed.

In these illustrative examples, operation 814 may include increasing the start timing offset if the first position of the first tow end is too close to the first marker on the tuning surface and decreasing the start timing offset if the first position of the first tow end is too far away from the first marker on the tuning surface. Further, operation 816 may include decreasing the stop timing offset if the second position of the second tow end is too close to the second marker on the tuning surface and increasing the stop timing offset if the second position of the second tow end is too far away from the second marker on the tuning surface.

Operations 814 and 816 may include normalizing the start latency and stop latency, respectively. For example, in some cases, the start latency may be normalized based on a first layup speed used during the layup process to generate a normalized latency. The start timing offset may then be adjusted based on the normalized latency and a second layup speed to be used in a future layup process. Similarly, in some cases, the stop latency may be normalized based on a first layup speed used during the layup process to generate a normalized latency. The stop timing offset may then be adjusted based on the normalized latency and a second layup speed to be used in a future layup process. The second layup speed may be faster or slower than the first layup speed.

Although process 800 is described with respect to a single tow, process 800 may be similarly implemented for an entire course or sequence of tows. As one illustrative example, in operation 802, a course of multiple, substantially parallel tows may be laid up using, for example, layup head 517 in FIG. 5.

Figure 9:
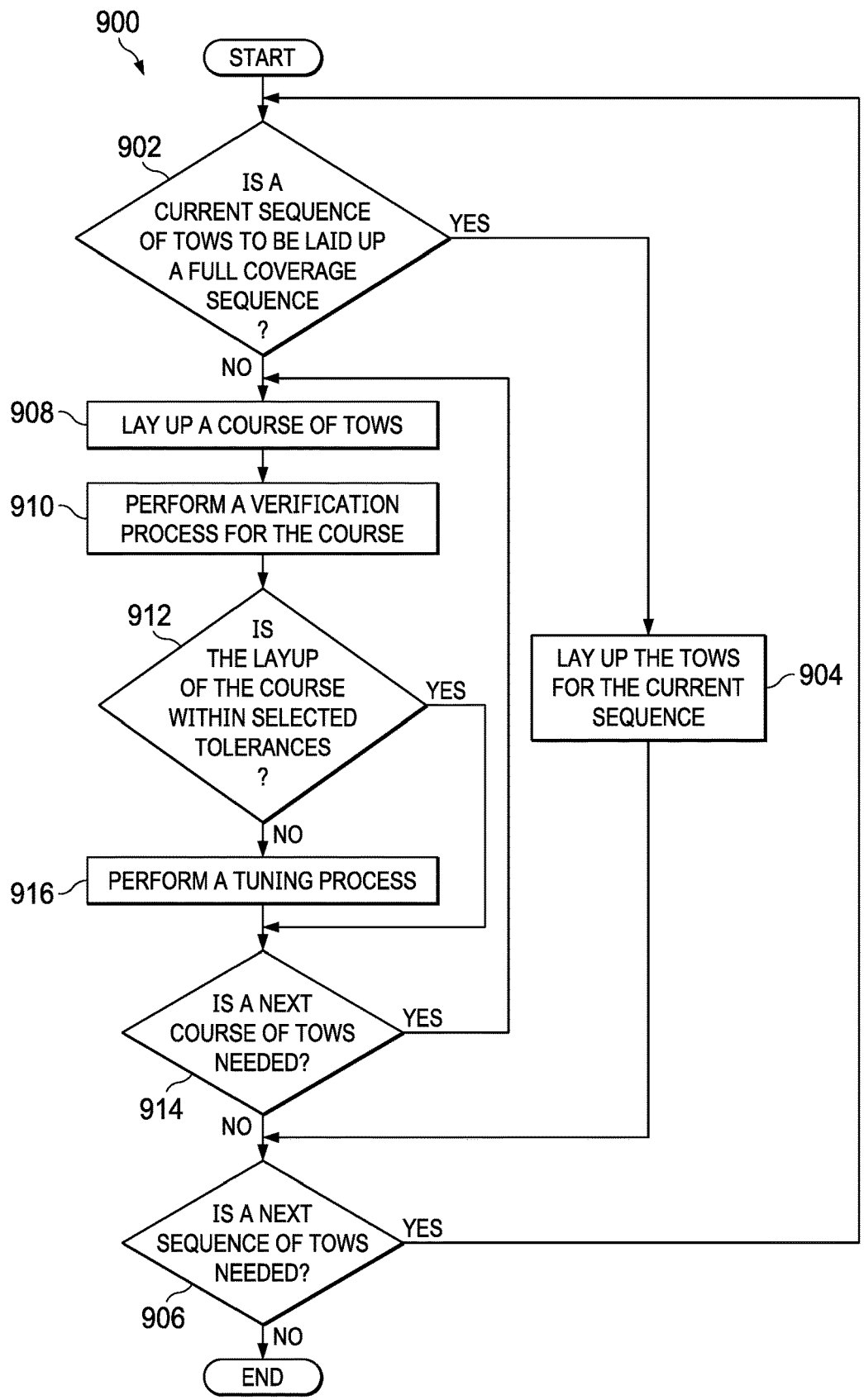
FIG. 9 is a flowchart of a process for managing tow end placement in accordance with an example embodiment.

FIG. 9 is flowchart of a process for managing tow end placement in accordance with an example embodiment. Process 900 illustrated in FIG. 9 may be performed during fabrication of composite laminate 502 described in FIG. 5. Further, process 900 illustrated in FIG. 9 may be implemented using composite manufacturing system 506 in FIG. 5.

Process 900 may begin by determining whether a current sequence of tows to be laid up is a full coverage sequence (operation 902). If the current sequence is to be a full coverage sequence, the process lays up the tows for the current sequence (operation 904). Next, a determination is made as to whether a next sequence of tows is needed (operation 906). If a next sequence is needed, the process returns to operation 902 described above to begin layup of the next sequence. If, however, a next sequence is not needed, the process terminates.

With reference again to operation 902, if the current sequence is not to be a full coverage sequence, the process lays up a course of tows (operation 908). Next, the process performs a verification process for the course (operation 910). This verification process may be performed using, for example, verification process 526 in FIG. 5 and may be implemented using one or both of process 600 described in FIG. 6 and process 700 described in FIG. 7. In these illustrative examples, operation 910 may include identifying a start latency and a stop latency for each tow of the course.

A determination is made as to whether the layup of the course is within selected tolerances (operation 912). Operation 912 includes determining whether the start latency, the stop latency, or both for the current course are within selected tolerances (e.g., a desired range). For example, operation 912 may include determining whether the identified start latencies are substantially equal to a start timing offset selected for the tow placement system and whether the identified stop latencies are substantially equal to a stop timing offset selected for the tow placement system. More specifically, operation 912 may include determining whether the identified start latencies and the identified stop latencies are within ±0.05 seconds, ±0.005 seconds, or some other predetermined range of the start timing offset and stop timing offset, respectively. In some cases, the average of the identified start latencies is compared to the start timing offset and the average of the identified stop latencies is compared to the stop timing offset.

If the layup of the course is within selected tolerances, a determination is made as to whether a next course of tows is needed for layup of the next sequence (operation 914). If a next course is not needed, the process proceeds to operation 906 described above. If, however, a next course of tows is needed, the process returns to operation 908 described above.

With reference again to operation 912, if the layup of the current course is not within selected tolerances, a tuning process is performed (operation 916). The tuning process may be, for example, tuning process 528 described in FIG. 5. Further, operation 916 may be implemented using the tuning process described in process 800 of FIG. 8. Thereafter, the process proceeds to operation 914 described above.

In this manner, process 900 may be performed with minimal interruptions to the overall layup process. Further, no time is spent imaging the tows or analyzing the images of the tows after each sequence. Still further, no time is spent manually identifying tow ends. Process 900 may reduce or eliminate the need to rework tow ends after a sequence has been laid up because the verification process allows the tuning process to be performed before a layer of tows having discrepant ends is laid up.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Further, other blocks may be added in addition to the illustrated blocks in a flowchart or block diagram. For example, while the processes described herein detail a manufacturing process with a certain sequence of assembly, other processes may include different sequences for the steps of the process, as needed.

FIGS. 10-14 are illustrations of the different stages in tuning process 528 from FIG. 5 in accordance with an example embodiment. Each stage occurs at a different time in the tuning process 528.

Figure 10:
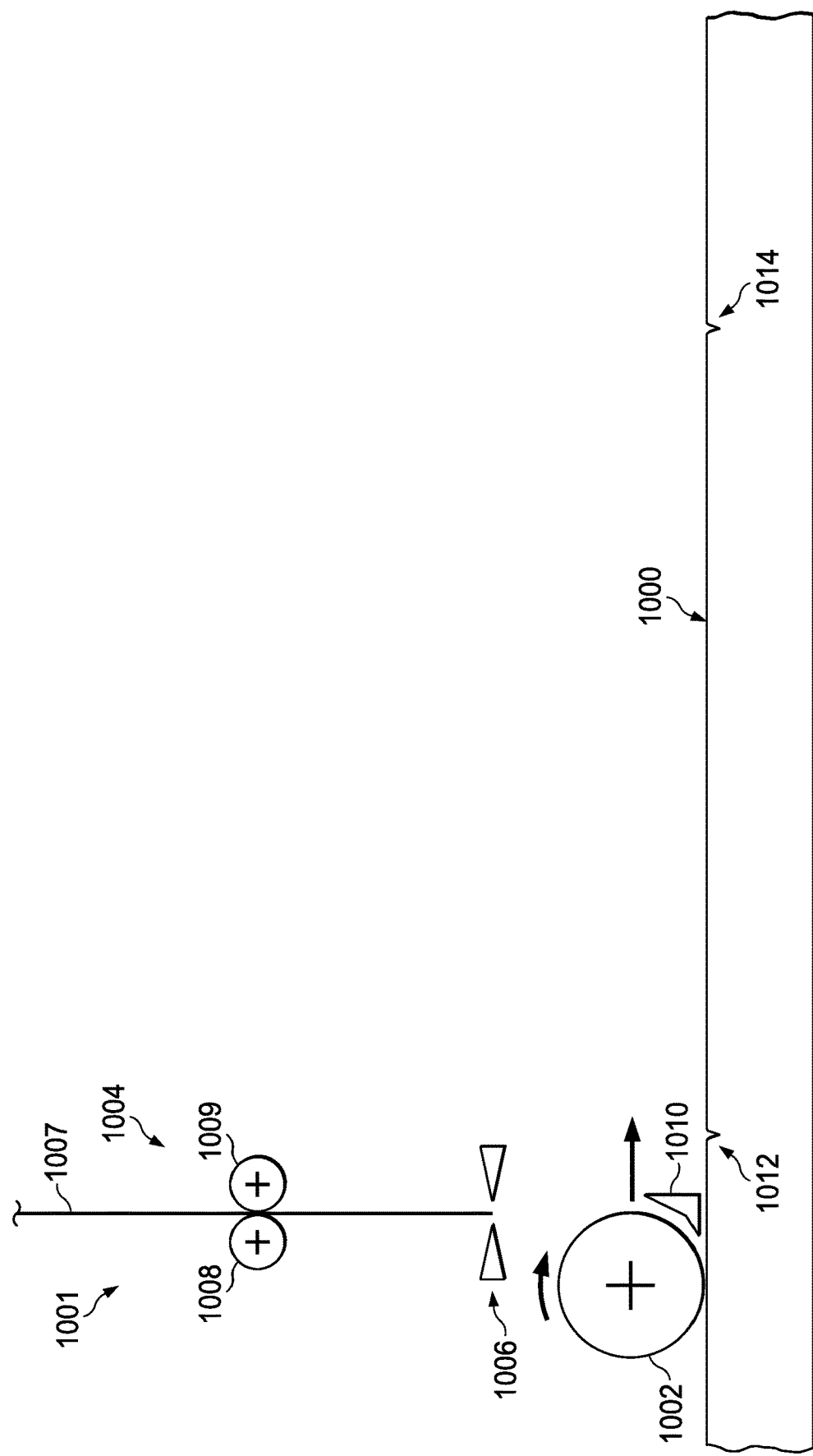
FIG. 10 is an illustration of a first stage in a tow tuning process in accordance with an example embodiment.

With reference now to FIG. 10, an illustration of a first stage in tuning process 528 from FIG. 5 is depicted in accordance with an example embodiment. The components shown in FIG. 10 are representational only and not meant to imply any architectural limitations or requirements to the example embodiments described above. In this illustrative example, tuning surface 1000 and tow placement system 1001 are depicted. Tuning surface 1000 is a representation of tuning surface 532 in FIG. 5. Tow placement system 1001 includes compaction roller 1002, tow feed mechanism 1004, and cutter 1006. In these illustrative examples, cutter 1006 is considered part of tow feed mechanism 1004. In other illustrative examples, cutter 1006 may be considered separate from tow feed mechanism 1004.

Tow 1007 is shown positioned between pinch roller 1008 and feed roller 1009 of tow feed mechanism 1004. In this illustrative example, compaction roller 1002 has guide 1010 that helps control movement of tow 1007 relative to compaction roller 1002 as tow 1007 is fed from tow feed mechanism 1004.

Tuning surface 1000 has first marker 1012 and second marker 1014. In this illustrative example, first marker 1012 and second marker 1014 take the form of notches in tuning surface 1000. Although first marker 1012 and second marker 1014 are depicted as notches in tuning surface 1000, these markers may be implemented in other ways. For example, a sensor on or in tuning surface 1000, tape adhered to tuning surface 1000, an ink mark, a laser mark, or some other type of marker may be used for either or both of first marker 1012 and second marker 1014.

The command to start actuation of pinch roller 1008 occurs at time T1. As shown in FIG. 10, at time T1, tow 1007 is stationary and has not yet been fed to compaction roller 1002. This is due to the delay between the time T1 at which the start command occurs and the time T2 at which actuation of pinch roller 1008 begins. Further, compaction roller 1002 is positioned before first marker 1012.

Figure 11:
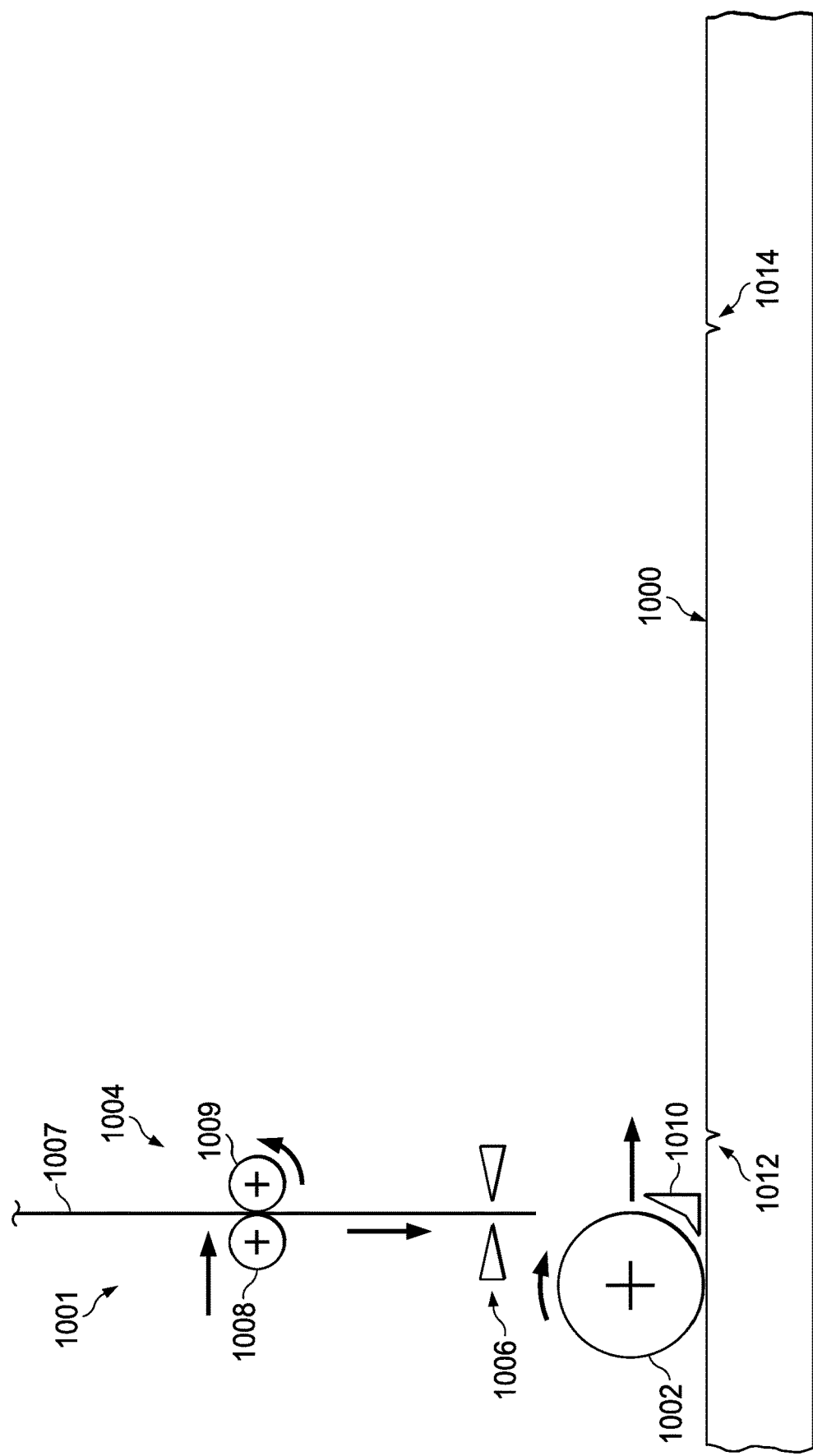
FIG. 11 is an illustration of a second stage in a tow tuning process in accordance with an example embodiment.

Turning now to FIG. 11, a second stage in tuning process 528 is depicted. This second stage begins when pinch roller 1008 is actuated to pinch (or nip) tow 1007. This pinching of tow 1007 while feed roller 1009 is turning feeds tow 1007 to compaction roller 1002.

Movement of tow 1007 begins at time T2, which is later than time T1 described with respect to FIG. 10 above. The time interval between time T1 and time T2 establishes start timing offset 546 described in FIG. 5.

Figure 12:
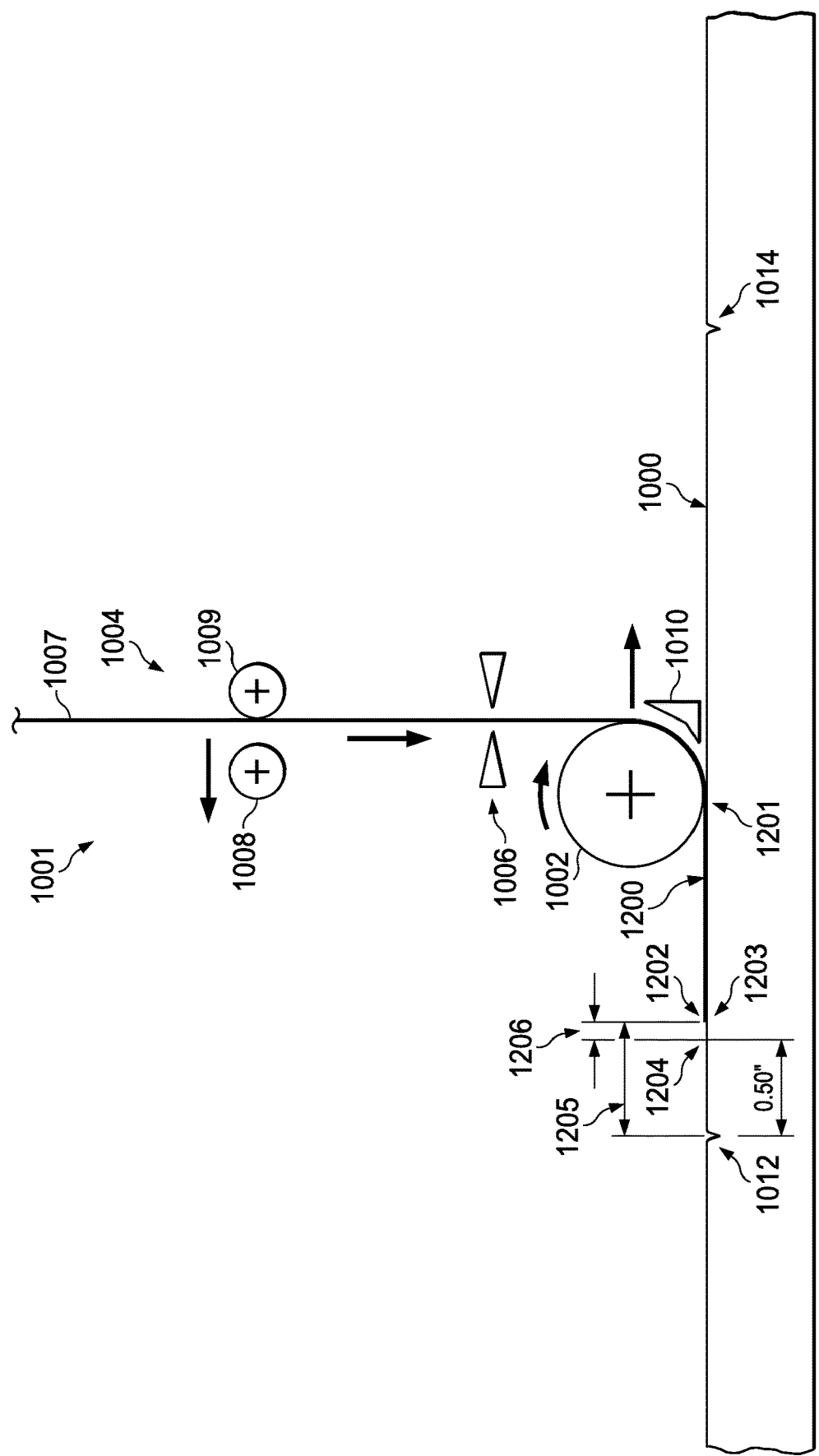
FIG. 12 is an illustration of a third stage in a tow tuning process in accordance with an example embodiment.

With reference now to FIG. 12, a third stage in tuning process 528 is depicted. During the third stage, tow 1007 is fed through tow feed mechanism 1004 and laid up on tuning surface 1000 to begin the formation of test tow 1200. Nip 1201 of compaction roller 1002 compresses the portion of tow 1007 that passes between roller 1002 and tuning surface 1000 to layup that portion of tow 1007 as part of test tow 1200.

The rolling of compaction roller 1002 causes first tow end 1202 of test tow 1200 to be placed at position 1203 after first marker 1012 on tuning surface 1000. Expected position 1204 for first tow end 1202 may be expected at about 0.5 inches away from first marker 1012. Position 1203 of first tow end 1202 may be at a different distance 1205 from first marker 1012, which may be, for example, about 0.52 inches away from first marker 1012. Any deviation of position 1203 from expected position 1204 may be displacement 1206 that is considered an error.

When the error is not within allowed tolerances, this is an indication that start timing offset 546 needs to be adjusted. For example, if position 1203 of first tow end 1202 is too close to first marker 1012, start timing offset 546 may need to be increased. If position 1203 of first tow end 1202 is too far away from first marker 1012, start timing offset 546 may need to be decreased. Thus, tuning process 528 is used to establish start timing offset 546 between time T1 and time T2 to be used during the layup process and verification process 526.

When the system is operating as expected, the start latency determined during verification process 526 is substantially equal to start timing offset 546 established between time T1 and time T2 during tuning process 528. During verification process 526, a sensor device in sensor system 514 may be implemented relative to or as part of tow feed mechanism 1004 to detect the time between time T1 and time T2 during the layup process. During verification process 526, placements of the first tow ends of tows are assumed to be acceptable if the start latency between time T1 and time T2 does not drift away from start timing offset 546 established during tuning process 528.

Figure 13:
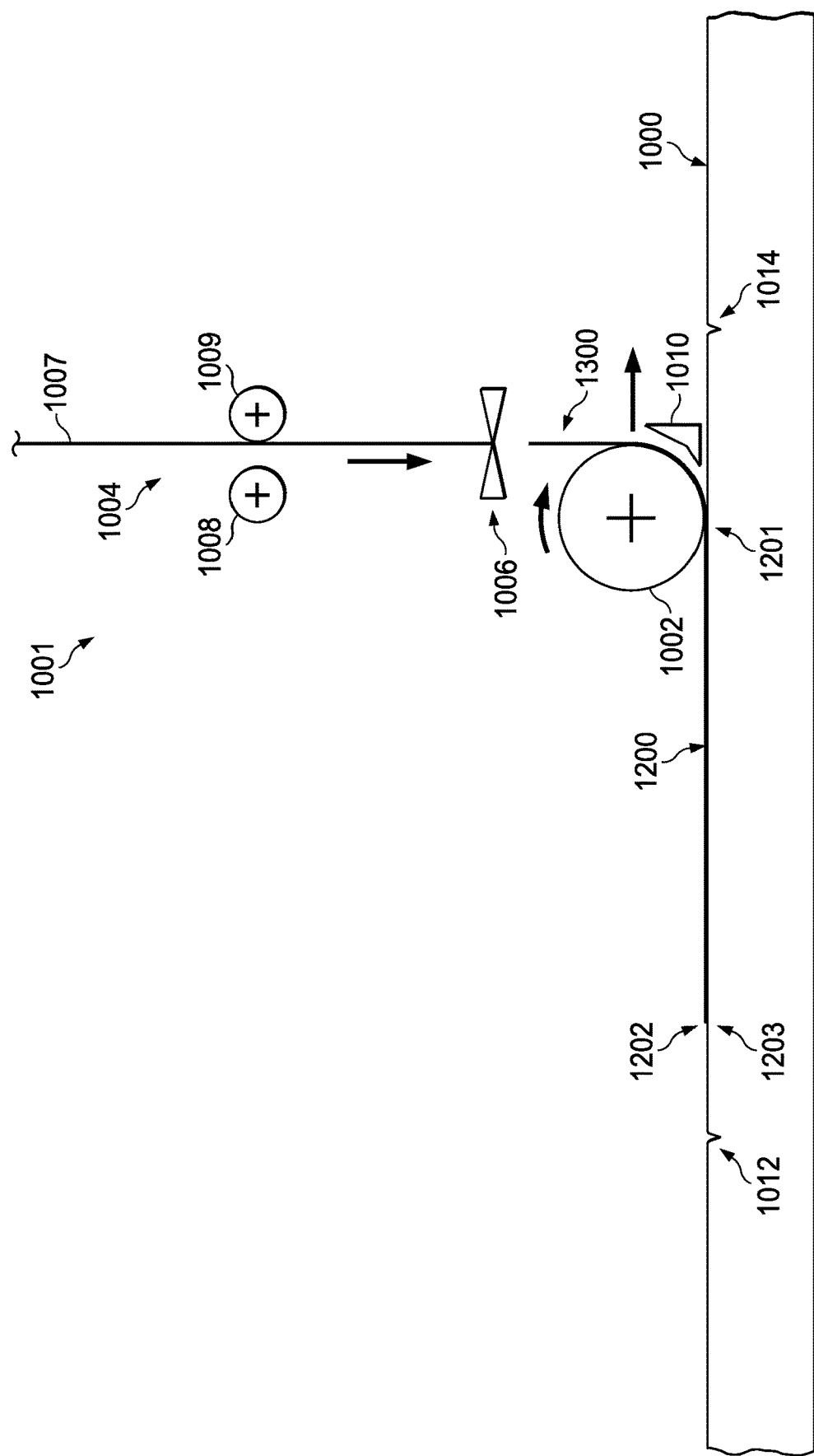
FIG. 13 is an illustration of a fourth stage in a tow tuning process in accordance with an example embodiment.

Turning now to FIG. 13, a fourth stage in tuning process 528 from FIG. 5 is depicted. At the fourth stage, cutter 1006 has been actuated to cut tow 1007 such that compaction roller 1002 will lay up the final portion of test tow 1200 on tuning surface 1000 to fully form test tow 1200. The cut of tow 1007 by cutter 1006 determines the final length of test tow 1200.

Guide 1010 helps ensure that end portion 1300 of tow 1007 substantially conforms to or follows compaction roller 1002. Guide 1010 may help ensure that end portion 1300 moves in coordination with compaction roller 1002. In particular, guide 1010 helps ensure that end portion 1300 of tow 1007 is guided into nip 1201 of compaction roller 1002. Locating guide 1010 close to nip 1201 of compaction roller 1002 may eliminate an uncontrolled length of tow 1007 after tow 1007 is cut.

The command to start actuation of cutter 1006 occurs at time T3. Movement of tow 1007 through tow feed mechanism 1004 stops at time T4. The time between T3 and T4 establishes stop timing offset 548 described in FIG. 5.

Figure 14:
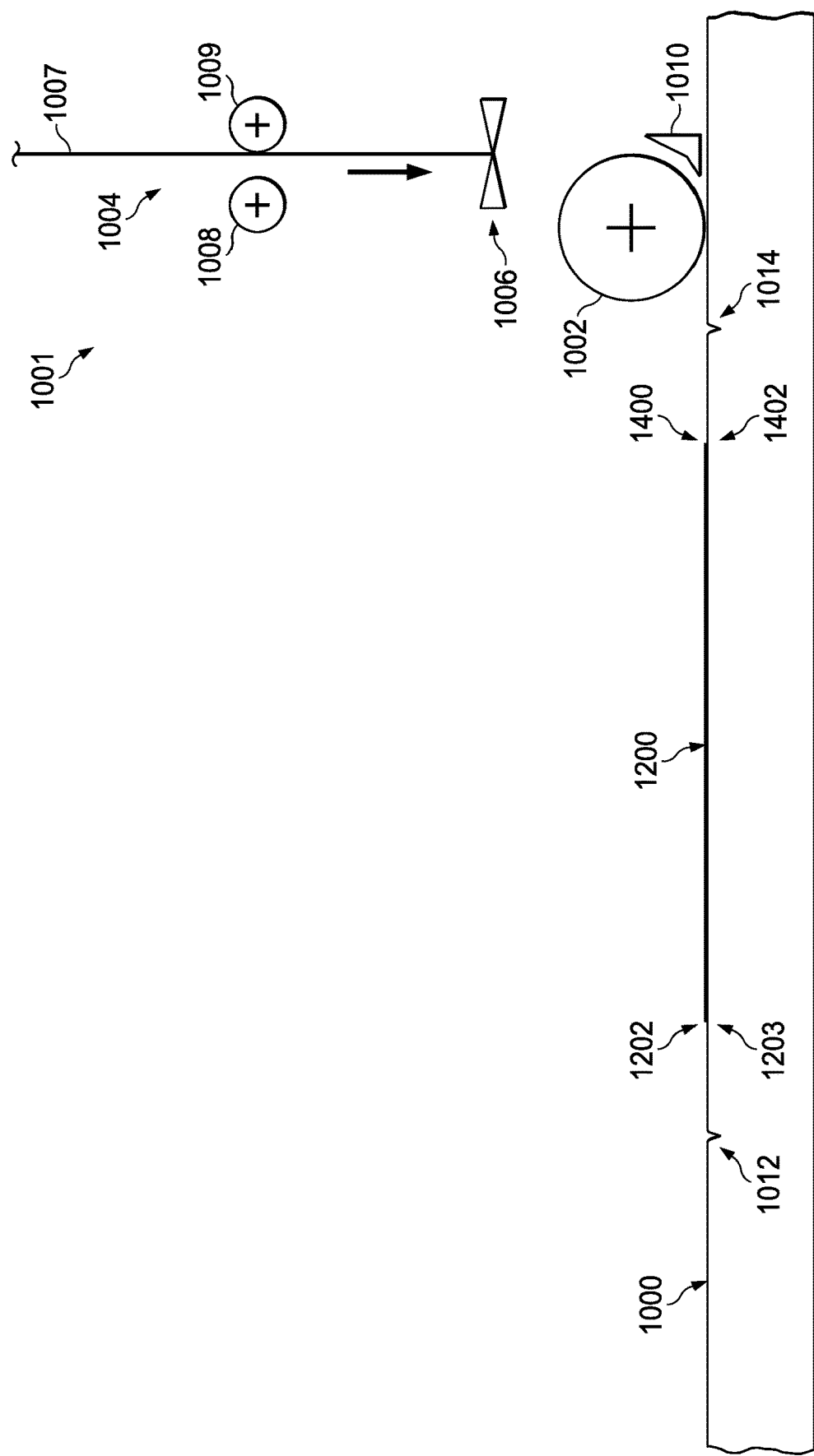
FIG. 14 is an illustration of a fifth stage in a tow tuning process in accordance with an example embodiment.

FIG. 14 depicts a fifth stage of tuning process 528 from FIG. 5. At the fifth state, test tow 1200 is completed. Although compaction roller 1002 is shown as having moved past second marker 1014, in other illustrative examples, tow placement system 1001, and thereby compaction roller 1002 may stop just after test tow 1200 has been completed and moved away to another position over tuning surface 1000.

Second tow end 1400 of test tow 1200 ends up at position 1402 on tuning surface 1000. Position 1402 may be expected at about 0.5 inches away from second marker 1014. Any deviation of position 1402 from the expected position may be considered an error. When the error is not within allowed tolerances, this is an indication that stop timing offset 548 needs to be adjusted. For example, if position 1402 of second tow end 1400 is too close to second marker 1014, stop timing offset 548 may need to be decreased. If position 1402 of second tow end 1400 is too far away from second marker 1014, stop timing offset 548 may need to be increased.

When the system is operating as expected, the stop latency determined during verification process 526 is substantially equal to stop timing offset 548 established between time T3 and time T4 during tuning process 528. During verification process 526, a sensor device in sensor system 514 may be implemented relative to or as part of tow feed mechanism 1004 to detect the time between time T3 (i.e. stop command time) and time T4 (i.e. stop time of movement of tow 1007) during the layup process. This sensor device may be the same one used for detecting the time between time T1 (i.e. start command time) and time T2 (i.e. start time for movement of tow 1007) described in FIG. 10 above, or a different sensor device. During verification process 526, placements of the second tow ends of the tows are assumed to be acceptable if the stop latency between time T3 and time T4 does not drift away from stop timing offset 548 established during tuning process 528.

Figure 15:
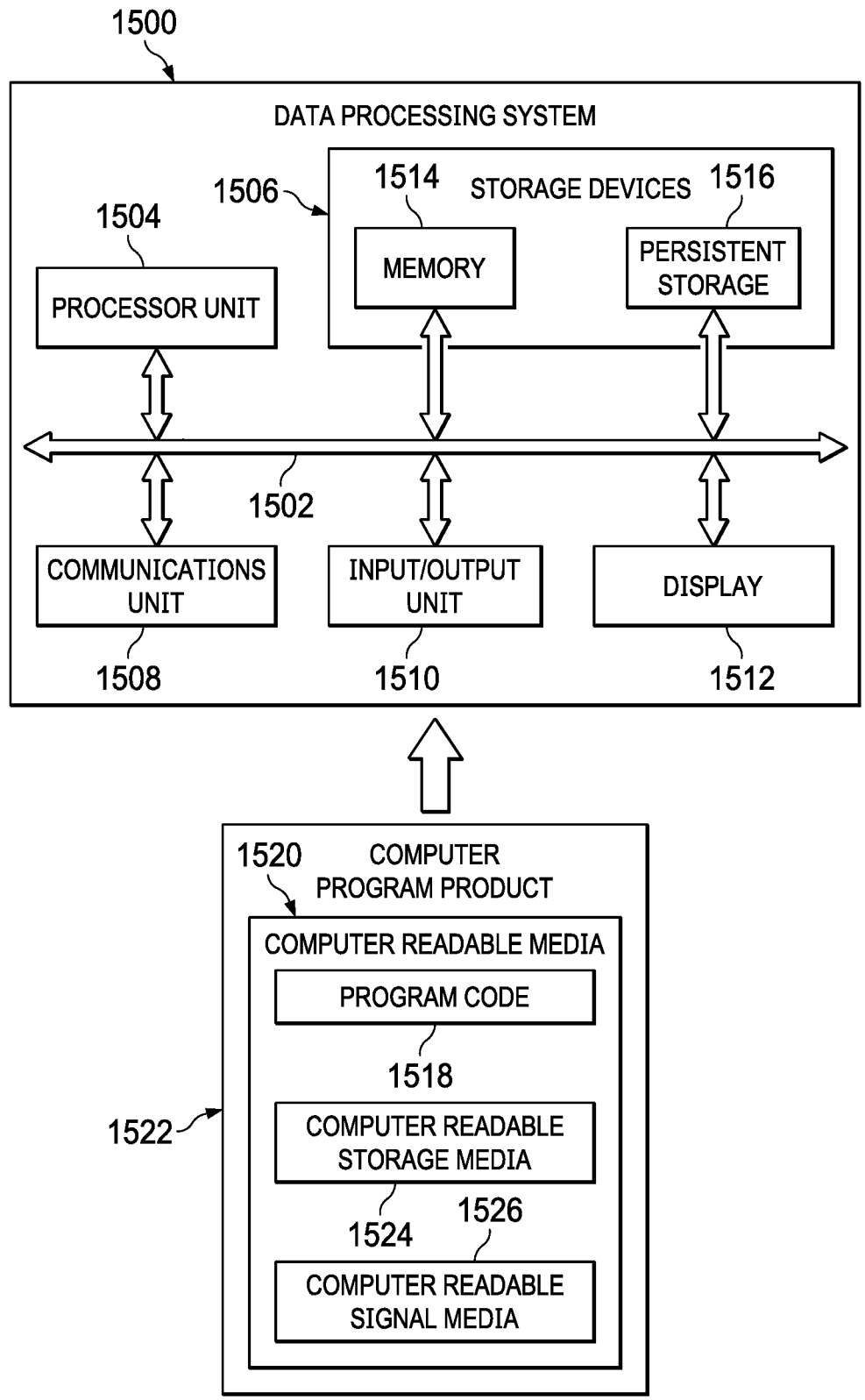
FIG. 15 is a block diagram of a data processing system in accordance with an example embodiment.

Turning now to FIG. 15, an illustration of a data processing system in the form of a block diagram is depicted in accordance with an illustrative embodiment. Data processing system 1500 may be used to implement control system 512 and/or computer system 515 in FIG. 5. As depicted, data processing system 1500 includes communications framework 1502, which provides communications between processor unit 1504, storage devices 1506, communications unit 1508, input/output unit 1510, and display 1512. In some cases, communications framework 1502 may be implemented as a bus system.

Processor unit 1504 is configured to execute instructions for software to perform a number of operations. Processor unit 1504 may comprise a number of processors, a multiprocessor core, and/or some other type of processor, depending on the implementation. In some cases, processor unit 1504 may take the form of a hardware unit, such as a circuit system, an application specific integrated circuit (ASIC), a programmable logic device, or some other suitable type of hardware unit.

Instructions for the operating system, applications, and/or programs run by processor unit 1504 may be located in storage devices 1506. Storage devices 1506 may be in communication with processor unit 1504 through communications framework 1502. As used herein, a storage device, also referred to as a computer readable storage device, is any piece of hardware capable of storing information on a temporary and/or permanent basis. This information may include, but is not limited to, data, program code, and/or other information.

Memory 1514 and persistent storage 1516 are examples of storage devices 1506. Memory 1514 may take the form of, for example, a random access memory or some type of volatile or non-volatile storage device. Persistent storage 1516 may comprise any number of components or devices. For example, persistent storage 1516 may comprise a hard drive, a flash memory, a rewritable optical disk, a rewritable magnetic tape, or some combination of the above. The media used by persistent storage 1516 may or may not be removable.

Communications unit 1508 allows data processing system 1500 to communicate with other data processing systems and/or devices. Communications unit 1508 may provide communications using physical and/or wireless communications links.

Input/output unit 1510 allows input to be received from and output to be sent to other devices connected to data processing system 1500. For example, input/output unit 1510 may allow user input to be received through a keyboard, a mouse, and/or some other type of input device. As another example, input/output unit 1510 may allow output to be sent to a printer connected to data processing system 1500.

Display 1512 is configured to display information to a user. Display 1512 may comprise, for example, without limitation, a monitor, a touch screen, a laser display, a holographic display, a virtual display device, and/or some other type of display device.

In this illustrative example, the processes of the different illustrative embodiments may be performed by processor unit 1504 using computer-implemented instructions. These instructions may be referred to as program code, computer usable program code, or computer readable program code and may be read and executed by one or more processors in processor unit 1504.

In these examples, program code 1518 is located in a functional form on computer readable media 1520, which is selectively removable, and may be loaded onto or transferred to data processing system 1500 for execution by processor unit 1504. Program code 1518 and computer readable media 1520 together form computer program product 1522. In this illustrative example, computer readable media 1520 may be computer readable storage media 1524 or computer readable signal media 1526.

Computer readable storage media 1524 is a physical or tangible storage device used to store program code 1518 rather than a medium that propagates or transmits program code 1518. Computer readable storage media 1524 may be, for example, without limitation, an optical or magnetic disk or a persistent storage device that is connected to data processing system 1500.

Alternatively, program code 1518 may be transferred to data processing system 1500 using computer readable signal media 1526. Computer readable signal media 1526 may be, for example, a propagated data signal containing program code 1518. This data signal may be an electromagnetic signal, an optical signal, and/or some other type of signal that can be transmitted over physical and/or wireless communications links.

The illustration of data processing system 1500 in FIG. 15 is not meant to provide architectural limitations to the manner in which the illustrative embodiments may be implemented. The different illustrative embodiments may be implemented in a data processing system that includes components in addition to or in place of those illustrated for data processing system 1500. Further, components shown in FIG. 15 may be varied from the illustrative examples shown.

Figure 16:
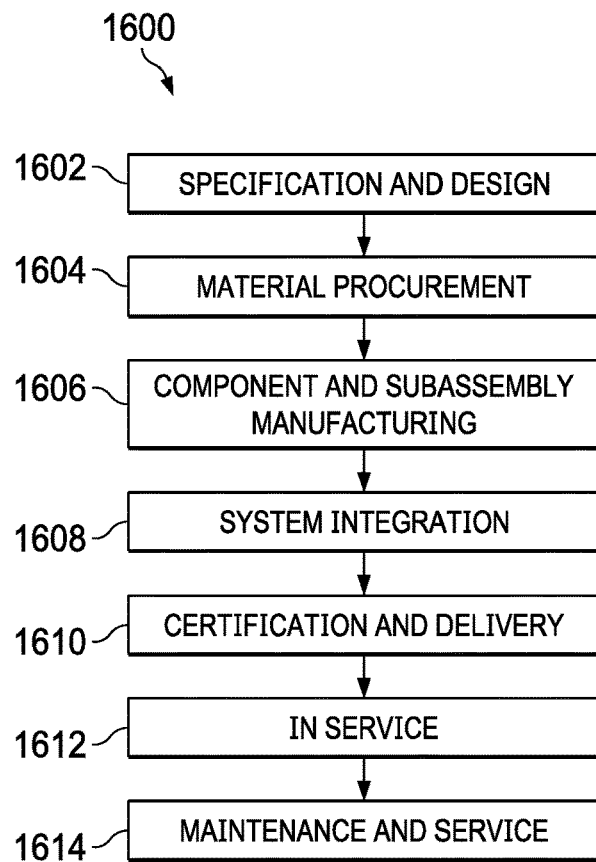
FIG. 16 is an illustration of an aircraft manufacturing and service method in accordance with an illustrative embodiment in accordance with an example embodiment.
Figure 17:
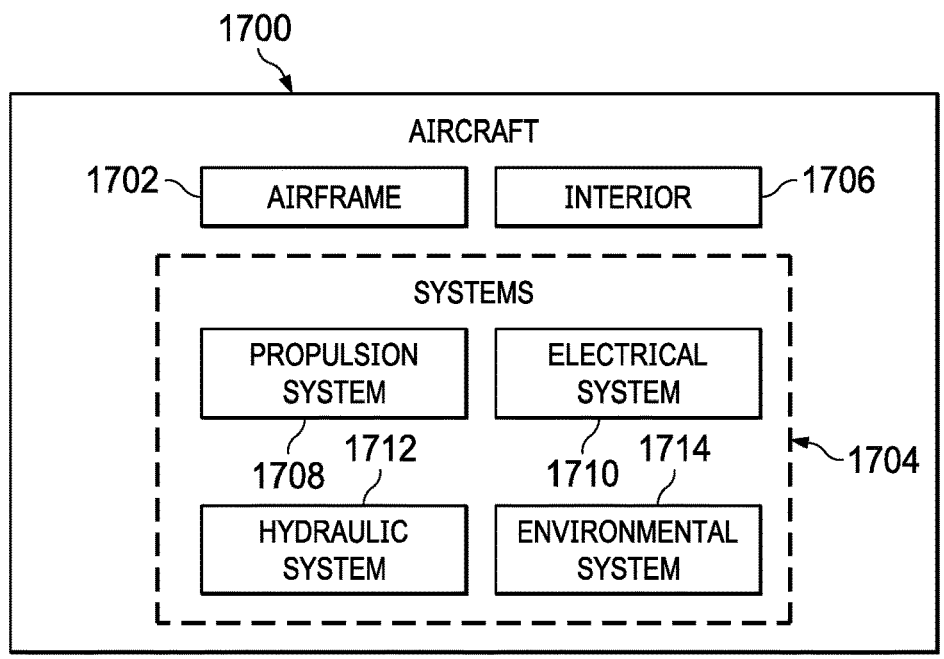
FIG. 17 is a block diagram of an aircraft in accordance with an example embodiment.

Illustrative embodiments of the disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in accordance with an illustrative embodiment. During preproduction, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an illustrative embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16. In particular, composite laminate 502 from FIG. 5 may be manufactured during any one of the stages of aircraft manufacturing and service method 1600. For example, without limitation, composite laminate 502 may be formed during at least one of component and subassembly manufacturing 1606, system integration 1608, routine maintenance and service 1614, or some other stage of aircraft manufacturing and service method 1600. Further, composite laminate 502 may be used to form a structure or other object that is part of airframe 1702, interior 1706, or some other portion of aircraft 1700.

In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16. As yet another example, one or more apparatus embodiments, method embodiments, or a combination thereof may be utilized during production stages, such as component and subassembly manufacturing 1606 and system integration 1608 in FIG. 16. One or more apparatus embodiments, method embodiments, or a combination thereof may be utilized while aircraft 1700 is in service 1612 and/or during maintenance and service 1614 in FIG. 16. The use of a number of the different illustrative embodiments may substantially expedite the assembly of and/or reduce the cost of aircraft 1700.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The description of the different illustrative examples has been presented for purposes of illustration and description, and is not intended to be exhaustive or limited to the embodiments in the form disclosed. Many modifications and variations will be apparent to those of ordinary skill in the art. Further, different illustrative examples may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for calibrating a tow placement system, the method comprising:
   laying up a tow over a tuning surface;
   measuring a first position of a first tow end of the tow;
   measuring a second position of a second tow end of the tow;
   computing a first error between the first position of the first tow end and an expected position for the first tow end;
   computing a second error between the second position of the second tow end and an expected position for the second tow end;
   determining whether at least one of the first error or the second error is outside of selected tolerances;
   adjusting a start timing offset of the tow placement system in response to a determination that the first error is outside of selected tolerances and a stop timing offset of the tow placement system in response to a determination that the second error is outside of selected tolerances,
      wherein the start timing offset determines an interval of time between when a start command for movement of the tow is generated and a desired start time for the movement of the tow; and
      wherein the stop timing offset determines an interval of time between when a stop command for movement of the tow is generated and a desired stop time for the movement of the tow; and
   controlling operation of the tow placement system using the start timing offset and the stop timing offset that have been adjusted.

2. The method of claim 1, wherein computing the first error comprises:
   computing a distance between the first position of the first tow end and a first marker on the tuning surface.

3. The method of claim 2, wherein computing the first error further comprises:
   computing a difference between a preselected distance and the distance computed between the first position of the first tow end and the first marker.

4. The method of claim 3, wherein determining whether at least one of the first error or the second error is outside of selected tolerances comprises:
  determining whether the difference is within a predetermined range of the preselected distance, wherein the preselected distance is selected from one of 0.25 inches, 0.5 inches, and 0.75 inches from the first marker and the predetermined range is selected from one of ±0.01 inches, ±0.001 inches, ±0.05 inches, or ±0.10 inches.

5. The method of claim 1, wherein computing the second error comprises:
  computing a distance between the second position of the second tow end and a second marker on the tuning surface.

6. The method of claim 5, wherein computing the second error further comprises:
  computing a difference between a preselected distance and the distance computed between the second position of the second tow end and the second marker.

7. The method of claim 6, wherein determining whether at least one of the first error or the second error is outside of selected tolerances comprises:
  determining whether the difference is within a selected range of zero, wherein the preselected distance is selected from a group consisting of 0.25 inches, 0.5 inches, and 0.75 inches from the second marker.

8. The method of claim 1, wherein adjusting the start timing offset of the tow placement system in response to the determination that the first error is outside of selected tolerances and the stop timing offset of the tow placement system in response to the determination that the second error is outside of selected tolerances comprises:
  increasing the start timing offset if the first position of the first tow end is too close to a first marker on the tuning surface to increase the interval of time between when the start command is generated and the desired start time.

9. The method of claim 1, wherein adjusting the start timing offset of the tow placement system in response to the determination that the first error is outside of selected tolerances and the stop timing offset of the tow placement system in response to the determination that the second error is outside of selected tolerances comprises:
  decreasing the start timing offset in response to a determination that the first position of the first tow end is too far away from a first marker on the tuning surface to decrease the interval of time between when the start command is generated and the desired start time.

10. The method of claim 1, wherein adjusting the start timing offset of the tow placement system in response to the determination that the first error is outside of selected tolerances and the stop timing offset of the tow placement system in response to the determination that the second error is outside of selected tolerances comprises:
  decreasing the stop timing offset in response to a determination that the second position of the second tow end is too close to a second marker on the tuning surface to decrease the interval of time between when the stop command is generated and the desired stop time.

11. The method of claim 1, wherein adjusting the start timing offset of the tow placement system in response to the determination that the first error is outside of selected tolerances and the stop timing offset of the tow placement system in response to the determination that the second error is outside of selected tolerances comprises:
  increasing the stop timing offset in response to a determination that the second position of the second tow end is too far away from a second marker on the tuning surface to increase the interval of time between when the stop command is generated and the desired stop time.

12. The method of claim 1, wherein the method is performed by a computer system and wherein the tow placement system is a numerically-controlled system.

13. The method of claim 1, further comprising:
  providing a composite structure for an aircraft, the composite structure being comprised of tows laid up via the method of claim 1.

14. A system for managing tow placement during a laying up of composite laminate, the system comprising:
  a tow placement system that lays up a tow over a tuning surface;
  a measurement system that measures a first position of a first tow end of the tow and a second position of a second tow end of the tow; and
  a control system that computes a first error between the first position of the first tow end and an expected position for the first tow end; computes a second error between the second position of the second tow end and an expected position for the second tow end; determines whether at least one of the first error or the second error is outside of selected tolerances; adjusts a start timing offset of a tow placement system in response to the determination that the first error is outside of selected tolerances and a stop timing offset of the tow placement system in response to the determination that the second error is outside of selected tolerances; and controlling operation of the tow placement system using the start timing offset and the stop timing offset that have been adjusted;
  wherein the start timing offset determines an interval of time between when a start command for movement of the tow is generated and a desired start time for the movement of the tow; and
  wherein the stop timing offset determines an interval of time between when a stop command for movement of the tow is generated and a desired stop time for the movement of the tow.

15. The system of claim 14, wherein the tuning surface has a first marker and a second marker for determining where a position of a first tow end and a second tow end of a tow are expected to be placed on the tuning surface.

16. The system of claim 14, wherein the tow placement system is a numerically-controlled automated fiber placement (AFP) system.

17. A method of fabricating a portion of an aircraft using the system of claim 14.

18. The system of claim 14, wherein the control system is configured to compute the first error by computing a distance between the first position of the first tow end and a first marker on the tuning surface; and computing a difference between a preselected distance and the distance computed between the first position of the first tow end and the first marker.

19. The system of claim 14, wherein the control system is configured to compute the second error by computing a distance between the second position of the second tow end and a second marker on the tuning surface; and computing a difference between a preselected distance and the distance computed between the second position of the second tow end and the second marker.

20. The system of claim 14, wherein the control system is configured to adjust the start timing offset by increasing the start timing offset if the first position of the first tow end is too close to a first marker on the tuning surface to increase the interval of time between when the start command is generated and the desired start time.

* * * * *